US012456254B2

(12) United States Patent
Liu et al.

(10) Patent No.: US 12,456,254 B2
(45) Date of Patent: Oct. 28, 2025

(54) TERRAIN GENERATION AND POPULATION SYSTEM

(71) Applicant: Electronic Arts Inc., Redwood City, CA (US)

(72) Inventors: Han Liu, San Francisco, CA (US); Mohsen Sardari, Redwood City, CA (US); Harold Henry Chaput, Belmont, CA (US); Navid Aghdaie, San Jose, CA (US); Kazi Atif-Uz Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 18/426,105

(22) Filed: Jan. 29, 2024

(65) Prior Publication Data

US 2024/0249472 A1    Jul. 25, 2024

Related U.S. Application Data

(63) Continuation of application No. 16/521,492, filed on Jul. 24, 2019, now Pat. No. 11,887,253.

(51) Int. Cl.
  *G06T 17/05* (2011.01)
  *A63F 13/52* (2014.01)
  (Continued)

(52) U.S. Cl.
  CPC .............. *G06T 17/05* (2013.01); *A63F 13/52* (2014.09); *A63F 13/80* (2014.09); *G06T 19/006* (2013.01);
  (Continued)

(58) Field of Classification Search
  CPC ....... G06T 17/05; G06T 19/006; A63F 13/52; A63F 13/80; A63F 2300/64; A63F 2300/66; A63F 13/65
  See application file for complete search history.

(56) References Cited

U.S. PATENT DOCUMENTS 8,422,763 B2   4/2013   Gutierrez
8,774,470 B1   7/2014   Schmidt
(Continued)

OTHER PUBLICATIONS

Bonning et al., "Interactive Sculpturing and Visualization of Unbounded Voxel Volumes," Proceedings of the 7th ACM Symposium on Solid Modeling and Applications, 2002.
(Continued)

*Primary Examiner* — Ronald Laneau
(74) *Attorney, Agent, or Firm* — Knobbe, Martens, Olson & Bear, LLP

(57) ABSTRACT

Embodiments of the systems and methods described herein provide a terrain generation and population system that can determine terrain population rules for terrain population objects and features when placing objects and features in a three dimensional virtual space. As such, the terrain generation and population system can generate realistic terrain for use in game. The terrain generation and population system can receive an image, such as a satellite image, and utilize artificial intelligence to perform image segmentation at the pixel level to segment features and/or objects in the image. The game terrain system can automatically detect and apply feature and object masks based on the identified features and/or objects from the image segmentation. The game terrain system can place the features and/or objects in corresponding masks in the three dimensional space according to the application of terrain population rules.

20 Claims, 13 Drawing Sheets

(51) Int. Cl.
*A63F 13/80* (2014.01)
*G06T 19/00* (2011.01)
(52) U.S. Cl.
CPC ....... *A63F 2300/64* (2013.01); *A63F 2300/66* (2013.01)

(56) References Cited

U.S. PATENT DOCUMENTS

| | | |
|---|---|---|
| 8,964,052 B1 | 2/2015 | Wooley et al. |
| 9,669,296 B1 | 6/2017 | Hibbert et al. |
| 9,782,668 B1 | 10/2017 | Golden et al. |
| 10,186,049 B1 | 1/2019 | Boardman |
| 10,369,472 B1 | 8/2019 | Mattar et al. |
| 10,818,070 B2 | 10/2020 | Liu et al. |
| 10,922,882 B2 | 2/2021 | Liu et al. |
| 11,331,575 B2 | 5/2022 | Mattar et al. |
| 11,335,058 B2 | 5/2022 | Ek |
| 11,400,376 B2 * | 8/2022 | Benedetto ............... A63F 13/35 |
| 11,410,372 B2 | 8/2022 | Liu et al. |
| 11,551,406 B2 * | 1/2023 | Youngblood ........... G06T 15/10 |
| 11,704,868 B2 | 7/2023 | Ek |
| 2002/0090985 A1 | 7/2002 | Tochner et al. |
| 2003/0058238 A1 | 3/2003 | Doak |
| 2003/0198402 A1 | 10/2003 | Zhang et al. |
| 2004/0027344 A1 | 2/2004 | Ohto |
| 2005/0264566 A1 | 12/2005 | Sommers |
| 2006/0223635 A1 | 10/2006 | Rosenberg |
| 2007/0021166 A1 | 1/2007 | Mattila |
| 2008/0146338 A1 | 6/2008 | Bernard et al. |
| 2009/0005140 A1 | 1/2009 | Rose et al. |
| 2009/0028380 A1 | 1/2009 | Hillebrand et al. |
| 2009/0102835 A1 | 4/2009 | Mikhailov |
| 2010/0215250 A1 | 8/2010 | Zhu |
| 2010/0306825 A1 | 12/2010 | Spivack |
| 2011/0090215 A1 | 4/2011 | Ohta |
| 2012/0208636 A1 | 8/2012 | Feige |
| 2012/0264518 A1 | 10/2012 | Rouille |
| 2012/0306850 A1 | 12/2012 | Balan |
| 2014/0104316 A1 | 4/2014 | Sharma et al. |
| 2014/0267273 A1 | 9/2014 | Kontkanen |
| 2014/0278847 A1 | 9/2014 | Gallo |
| 2014/0306866 A1 | 10/2014 | Miller |
| 2015/0141141 A1 | 5/2015 | Suzuki et al. |
| 2015/0228114 A1 | 8/2015 | Shapira |
| 2016/0180540 A1 | 6/2016 | Lookingbill et al. |
| 2016/0196596 A1 | 7/2016 | Van Wie et al. |
| 2017/0243352 A1 | 8/2017 | Kutliroff |
| 2018/0350137 A1 | 12/2018 | Skidmore et al. |
| 2019/0026956 A1 | 1/2019 | Gausebeck |
| 2019/0178643 A1 | 6/2019 | Metzler et al. |
| 2020/0129862 A1 | 4/2020 | Liu |
| 2020/0312042 A1 | 10/2020 | Sardari et al. |
| 2021/0082172 A1 | 3/2021 | Liu et al. |
| 2022/0114787 A1 | 4/2022 | Ek |
| 2022/0343594 A1 | 10/2022 | Ek |
| 2024/0070981 A1 * | 2/2024 | Canelhas ............... G06T 19/20 |

OTHER PUBLICATIONS

Clement et al., "Adaptable aging factor for multiple objects and colorations",Elsevier, Computers & Graphics, 34, pp. 460-467.
Clement et al., "Enhancing Image-Based Aging Approaches", The Eurographics Association, Eurographics, 2011, Short pages.
Dai et al., "ScanComplete: Larege-Scale Scene Completion and Semantic Segmentation for 3D Scans", Jun. 23, 2018, IEEE, 2018 IEEE/CVF Conference on Computer Vision and Pattern Recognition.
Gunther et al., "GPU-accelerated Interactive Material Aging", The Eurographics Association, in Vision, Modeling and Visualization, 2012.
Hecht et al. "Automatic identification of building types based on topographic databases—a comparison of different data sources," Intl J of Cartograph (2015) vol. 1:1(18-31).
Ingress FAQ. reddit.com. Online. 2015. Accessed via the Internet. Accessed Jul. 31, 2021. <URL: https://www.reddit.com/r/ingress/wiki/faq#wiki_portals> (Year: 2015).
Karsch et al., "Rendering Synthetic Objects into Legacy Photographs", ACM, Dec. 2011, ACM Transactions on Graphics, vol. 30, No. 6, article 157, pp. 1-12.
Li et al., "Database-Assisted Object Retrieval for Real-Time 3D Reconstruction", Jun. 22, 2015, The Eurographics Association, Computer Graphics Forum, vol. 34, No. 2.
Qi, Jianzhong, et al. "Theoretically Optimal and Empirically Efficient r-trees with Strong Parallelizability." Proceedings of the VLDB Endowment 11.5 (2018): 621-634. (Year: 2018).
Wang et al., "Holistic 3D Scene Understanding from a Single Geo-tagged Image", Jun. 12, 2015, IEEE, Urtasun; Proceedings of the IEEE Conference on Computer Vision and Pattern Recognition (CVPR), 2015, pp. 3964-3972.
Wortel, "Optimizing octree updates for visibility determination on dynamic scenes," Master's Thesis, Leiden Institute of Advanced Computer Science (LIACS), Leiden University, 2011.
Zamri, Muhamad Najib, et al. "Real-Time Data Retrieval Technique for Virtual GIS," Advance in Spatial Information System: Application Development in Geographical Information System, Chapter 10, pp. 197 to 211, Jan. 2007. (Year: 2007).
Zia et al., "Towards Scene Understanding with Detailed 3D Object Representations", Nov. 4, 2014, Springer, International Journal of Computer Vision, 112: 188-203.
Zhang et al., "Efficient Quadtree Construction for Indexing Large-Scale Point Data on GPUs: Bottom-Up vs. Top-Down," ADMS@VLDB, 2019.

* cited by examiner

400 ⤴

620

630

660

670

TERRAIN GENERATION AND POPULATION SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated herein by reference in their entirety under 37 CFR 1.57.

BACKGROUND

Video games have featured three dimensional (3D) terrain since the earliest 3D graphics. In order to create terrain for a game world, developers manually create all the terrain. In some instances, the process can be improved by using public LIDAR data to help generate 3D models of real world terrain. However, the developers must manually incorporate the terrain and modify the terrain to match the terrain of the game world. This can be a very lengthy and time consuming process. There is a need to effectively and efficiently enable game developers to generate 3D terrain for use within virtual game environments.

SUMMARY OF EMBODIMENTS

The systems, methods, and devices of this disclosure each have several innovative aspects, no single one of which is solely responsible for the all of the desirable attributes disclosed herein.

Some embodiments disclose a method for generating game terrain data of a video game application within a graphical user interface, wherein the method includes: receiving first height field data and a first top view image of a geographical location; generating a segmented image by: identifying categories of terrain type based on the first top view image and the first height field data; and applying masks corresponding to the categories of the terrain type to the first height field data to generate the segmented image; accessing terrain population rules for each of the identified categories of terrain type; populating three dimensional virtual objects that correspond to the identified categories of terrain type; placing the three dimensional virtual objects in a three dimensional virtual space based on the terrain population rules; generating a second top view image of the three dimensional virtual space; determining a difference between the second top view image of the three dimensional virtual space and the first top view image of the geographical location; and in response to the difference meeting a predetermined threshold, applying the terrain population rules to generate terrain data for the video game application.

In some embodiments, the first height field data includes real world height field data of the geographical location, and the first top view image of the geographical location includes a satellite image of the geographical location.

In some embodiments, applying the terrain population rules include applying the terrain population rules on second height field data different than the first height field data.

In some embodiments, the second height field data includes game developer generated height field data.

In some embodiments, the method further comprises generating cleaned height field data and generating the three dimensional virtual space corresponding to elevations of the cleaned height field data.

In some embodiments, generating the cleaned height field data includes applying a frequency filter or an encoder/decoder neural network to the first height field data.

In some embodiments, generating the cleaned height field data is based on the identified categories of terrain type.

In some embodiments, determining the difference includes a pixel-by-pixel comparison of the first top view image and the second top view image.

In some embodiments, the method further comprises in response to the difference not meeting the predetermined threshold, adjusting the terrain population rules.

Some embodiments disclose a system comprising: one or more processors configured with computer executable instructions that configure the one or more processors to: receive first height field data and a top view image of a geographical location; generate a segmented image by: identify categories of terrain type based on the top view image; and apply masks corresponding to the categories of the terrain type to the first height field data to generate the segmented image; access terrain population rules for each of the identified categories of terrain type; populate three dimensional virtual objects that correspond to the identified categories of terrain type; place the three dimensional virtual objects in a three dimensional virtual space based on the terrain population rules; generate a second top view image of the three dimensional virtual space; determine a difference between the second top view image of the three dimensional virtual space and the top view image of the geographical location; and in response to the difference meeting a predetermined threshold, apply the terrain population rules to generate terrain data for a video game application.

In some embodiments, the first height field data includes a height field image, wherein at least a portion of the height field image correspond to the same geographical location as the top view image.

In some embodiments, the one or more processors are further configured to apply changes requested by a game developer to the generated terrain data.

In some embodiments, the terrain population rules include a distance between placement of the three dimensional virtual objects.

In some embodiments, the terrain population rules include a size and/or shape of the three dimensional virtual objects.

In some embodiments, the terrain population rules include adjusting a characteristic of the three dimensional virtual objects based on elevation of the three dimensional virtual space.

In some embodiments, the terrain population rules include adjusting a characteristic of the three dimensional virtual objects for one category of terrain type based on a neighboring category of terrain type.

Some embodiments disclose a non-transitory computer-readable storage medium having stored thereon instructions that, when executed, cause at least one processor to: receive first height field data and a top view image of a geographical location; generate a segmented image by: identify one or more categories of terrain type based on the top view image; and apply one or more masks corresponding to the one or more categories of the terrain type to the first height field data to generate the segmented image; access terrain population rules for each of the identified one or more categories of terrain type; populate three dimensional virtual objects that correspond to the identified one or more categories of terrain type; place the three dimensional virtual objects in a three dimensional virtual space based on the terrain population rules; generate a second top view image of the three dimensional virtual space; determine a difference between the second top view image of the three dimensional virtual space and the top view image of the geographical location; and in response to the difference meeting a predetermined threshold, apply the terrain population rules to generate terrain data for a video game application.

In some embodiments, accessing terrain population rules are based on a geographical style.

In some embodiments, accessing terrain population rules are based on a video game style.

In some embodiments, generating the segmented image is based on applying an encoder-decoder neural network to the top view image.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

There is a need to effectively and efficiently enable generation of three dimensional representations of macro features and smaller objects from the real world. Existing game development systems may allow a developer to individually create features, such as mountains, rivers, valleys, and objects, such as vegetation, buildings, and roads. Then, the developer can place the features and objects into a three dimensional space. However, these objects may not be placed according to how features and objects are distributed with respect to each other. Moreover, the positions of the features and objects placed into the three dimensional space may not accurately represent how these features and objects are typically scattered in a real-life location. Such development can rely heavily on the craftsmanship of the developer, and can be an extremely time intensive and tedious process.

Some embodiments of the present disclosure include a terrain generation and population system that mitigates and/or eliminates the drawbacks of traditional game development systems, including existing game development systems. The terrain generation and population system can determine terrain population rules for terrain population objects and features when placing objects and features in a three dimensional virtual space. As such, the terrain generation and population system can generate realistic terrain for use in a game application.

In some embodiments, the terrain generation and population system can receive an image, such as a satellite image, and utilize artificial intelligence, such as machine learning algorithms, neural networks, modeling, and/or the like to perform image segmentation at the pixel level to segment features and/or objects in the image. The game terrain system can automatically detect and apply feature and object masks based on the identified features and/or objects from the image segmentation. The game terrain system can place the features and/or objects in corresponding masks in the three dimensional space according to the application of terrain population rules.

In some embodiments, the terrain generation and population system can train machine learning algorithms, such as a convolutional neural network, to segment a satellite image for various categories of terrain, such as vegetation, roads, trees, or buildings. The terrain generation and population system can apply corresponding masks to the satellite image based on the segmentation. The terrain generation and population system can apply terrain population rules that are specific to each category of terrain when reconstructing the terrain in the three dimensional virtual space based on the two dimensional satellite image and heightfield data.

Training a Terrain Generation System Block Diagram

Figure 1A:
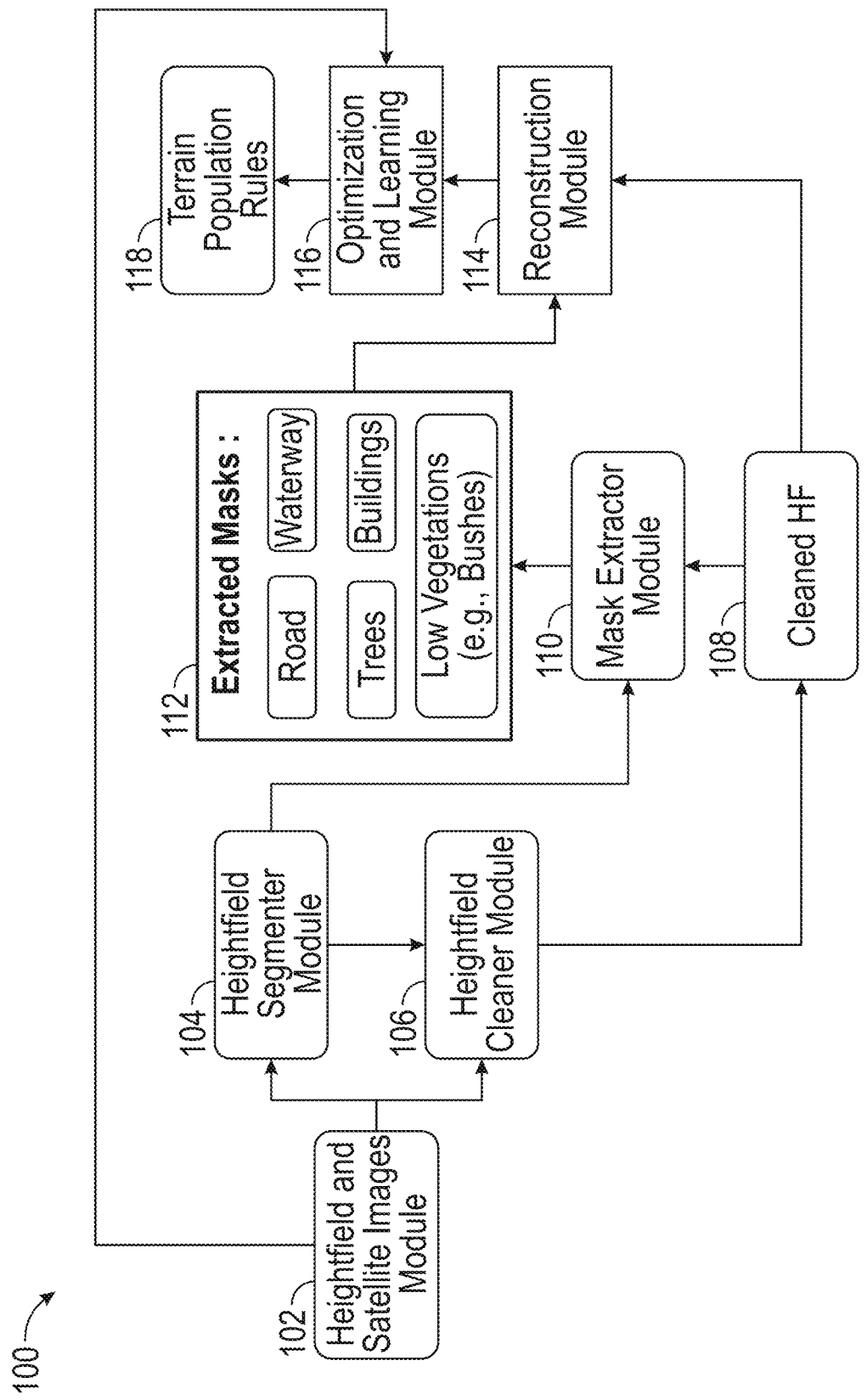
FIG. 1A provides a block diagram for training a terrain generation and population system and associated data flow.

FIG. 1A provides a block diagram 100 for training a terrain generation and population system and associated data flow. In the illustrated embodiment, the terrain generation and population system can include a heightfield and satellite images module 102, a heightfield segmenter module 104, a heightfield cleaner module 106, a mask extractor module 110, a reconstruction module 114, and an optimization and learning module 116. The terrain generation and population system can access and/or generate heightfield and satellite images, extracted masks 112, cleaned heightfield 108, and/or terrain population rules 118. In some embodiments, the terrain generation and population system can include more or less components. For example, the terrain generation and population system can receive an image from one or more external sources instead of from the heightfield and satellite images module 102 to take the image (e.g., the system may be operated on one or more servers, which receive images from a satellite system over a network).

In some embodiments, the heightfield and satellite images module 102 can receive an image, such as a satellite image, of a real world location. The satellite image can include a color image of the terrain taken by a satellite. The satellite image can include pixels. Each pixel can include data that corresponds to a color, such as red, green, blue, or a combination thereof. The satellite image can be retrieved from a database of satellite data for the world and/or for a particular region. The satellite image can be retrieved based on a selection of a location or an automated determination of a location, such as a location of a user device. The satellite image can be of a political boundary, such as a city or a state. The satellite image can be of a particular landscape, such as the Rocky Mountains. The satellite image can be an image of a real life location. The image can be any shape or resolution (e.g., circle, square, rectangular, or any other defined or undefined shape).

In some embodiments, the heightfield and satellite images module 102 can receive a heightfield of a real location that can include height information of terrain and objects. The heightfield can be generated by scanning real world terrain, such as based on Light Detection and Range (LIDAR) data. LIDAR can remotely measure height and density of terrain over large areas. Light can be emitted, reflected off features and objects, such as buildings and tree branches, and the reflected light energy can be retrieved by a LIDAR sensor that records the return signal and other relevant characteristics, such as the signal strength, the time of return, the frequency, and/or the like. This information can be used to generate a heightfield to determine the elevation of features and objects of a terrain. In some embodiments, the heightfield data can be infrared, ultraviolet, other data indicating height, and/or the like.

In some embodiments, portions of the satellite image can correspond to portions of the heightfield image. For example, the satellite image is paired with the heightfield image. Each pixel of the satellite image may correspond to a pixel in the heightfield image. In some embodiments, the portion of the satellite image can have a different image characteristic than the portion of the heightfield image, such as a different resolution. A pixel of the satellite image can correspond to a plurality of pixels in the heightfield image, and/or a plurality of pixels of the satellite image can correspond to a pixel in the heightfield image. For example, a satellite image can be 1000×1000 pixels, but the heightfield image can be 10000×10000 pixels. In this example, a pixel in the satellite image can correspond to a 10×10 pixel grouping. A group of pixels of the satellite image can correspond to a group of pixels in the heightfield image. Each pixel in the image can have defined color values (e.g., RGB color values). The pixel can correspond to a certain height in the heightfield image.

In some embodiments, the heightfield segmenter module 104 can receive the heightfield and satellite image from the heightfield and satellite images module 102. The heightfield segmenter module 104 can process the heightfield and satellite images through a machine learning algorithm, such as an encoder-decoder neural network, to segment the terrain by identifying categories for each pixel in the images. For example, the heightfield segmenter module 104 can categorize a group of pixels as a type of object or feature, such as a road, trees, waterways, buildings, vegetation, and/or the like.

In some embodiments, the heightfield cleaner module 106 can receive the heightfield image and the satellite image from the heightfield and satellite images module 102. The heightfield cleaner module 106 can remove objects or features in the images to generate a cleaned heightfield 108. The heightfield cleaner module 106 can apply a filter, such as a frequency filter, or pass the images through a machine learning algorithm, such as an encoder-decoder neural network, to remove the objects and features from the images in order to generate the cleaned heightfield 108.

In some embodiments, the heightfield cleaner module 106 can remove objects or features that were identified in the heightfield segmenter module 104. The heightfield segmenter module 104 can send the identified categories to the heightfield cleaner module 106. The heightfield cleaner module 106 can adapt the processing of the image based on the input from the heightfield segmenter module 104. For example, the heightfield cleaner module 106 can increase the frequency of a frequency filter in a specific area on the terrain, such as in a high density forest area, but set a low frequency in a road or waterway area.

In some embodiments, a mask extractor module 110 can apply masks for the categories that were identified by the heightfield segmenter module 104. For example, the mask extractor module 110 can apply the forest masks to the pixels that were identified by the heightfield segmenter module 104 that are in the forest category. The mask extractor module 110 can receive the categories identified by the heightfield segmenter module 104. The mask extractor module 110 can apply the masks to the cleaned heightfield 108 to generate a heightfield with extracted masks 112 based on the identified categories. The mask extractor module 110 can apply the masks via a generative model. In some embodiments, the trained generative model can be trained to map between heightfield data and corresponding masks to synthesize masks as a mask image.

In some embodiments, a reconstruction module 114 can receive the extracted masks 112 and the cleaned heightfield 108 in order to reconstruct the terrain. The reconstruction module 114 can take the cleaned heightfield 108, and add features and objects to the masked areas of the clean height field. For example, the reconstruction module 114 can identify that a highly densified forest mask is applied to a first area of the clean height field, a collection of roads mask is applied to the second area, and a city mask is applied to the third area of the height field image.

In some embodiments, the reconstruction module 114 can generate a three dimensional virtual space. The three dimensional virtual space can correspond to the height field image and/or the satellite image. For example, a first portion of the three dimensional virtual space can correspond to a first side of the height field image, and a third portion of the three dimensional virtual space can correspond to a third side of the height field image.

In some embodiments, the reconstruction module 114 can add three dimensional virtual representation of trees to a first side of the three dimensional virtual space based on the identified forest mask on the first side of the height field image, add three dimensional virtual representation of roads to the second area of the virtual space, and three dimensional virtual representation of buildings to the third area of the virtual space.

In some embodiments, the reconstruction module 114 can reconstruct a two dimensional terrain image by capturing a view, such as a top view, of the three dimensional virtual space. The reconstruction module 114 can transmit the two dimensional terrain top view to the optimization and learning module 116 for comparison with the satellite image.

In some embodiments, an optimization and learning module 116 can receive the reconstructed two dimensional terrain image of the top view for the virtual space. The optimization and learning module 116 can receive a satellite image from the heightfield and satellite images module 102. The optimization and learning module 116 compare the reconstructed two dimensional terrain image with the satellite image to determine an error or difference. The error or difference can be a holistic error or difference of the entire image and/or can be an error or difference for a certain area, such as the first area. The error or difference can be pixel by pixel. The error or difference can be for a certain feature type, such as the forest in the first area or all forest feature types. For example, the error or difference can be for sizes of trees, distance between features or objects, types of trees selected, and/or the like.

In some embodiments, the error or difference can be for transitional areas, such as the transition between a forest to a series of roads or waterways. Advantageously, in real life, the transition between a forest to a waterway may be more gradual than a transition between a forest and a building. The optimization and learning module 116 can train the machine learning algorithm to account for these differences when recreating the terrain based on heightfield and satellite images.

In some embodiments, the optimization and learning module 116 can adjust one or more machine learning algorithms of the terrain generation and population system based on the error or difference. The optimization and learning module 116 can adjust the heightfield segmenter module 104. For example, the optimization and learning module 116 can determine that the heightfield segmenter module 104 accurately identified forests but was less accurate with building identification. The optimization and learning module 116 can reinforce the weights for the nodes of the machine learning network that identified the forests, and adjust or change the weights for the nodes that identify the buildings. The optimization and learning module 116 can determine that the reconstruction module 114 scattered the forests accurately, but did not scatter the crops correctly. The optimization and learning module 116 can reinforce the weights that scattered the forests, and adjust or change the weights for the nodes that scattered the crops. For example, the optimization and learning module 116 can adjust or modify the placement of the crops, the types of crops, the color of the crops, the height of the crops, the width of the crops, and/or the like. For example, the optimization and learning module 116 can adjust the nodes of the generative network of the mask extractor module 110, and/or the encoder-decoder network of the heightfield segmenter module 104 and the heightfield cleaner module 106.

In some embodiments, the optimization and learning module 116 can determine that the comparison between the reconstructed image and the real satellite image meets and/or exceeds a specified threshold. The optimization and learning module 116 can save the terrain population rules 118 used in the reconstruction module 114 for later use in a future inference operation.

In some embodiments, the optimization and learning module 116 can save the terrain population rules for each category of objects. For example, the specified threshold can be for a particular object type, such as roads or trees.

Three Dimensional Reconstruction System Block Diagram

Figure 1B:
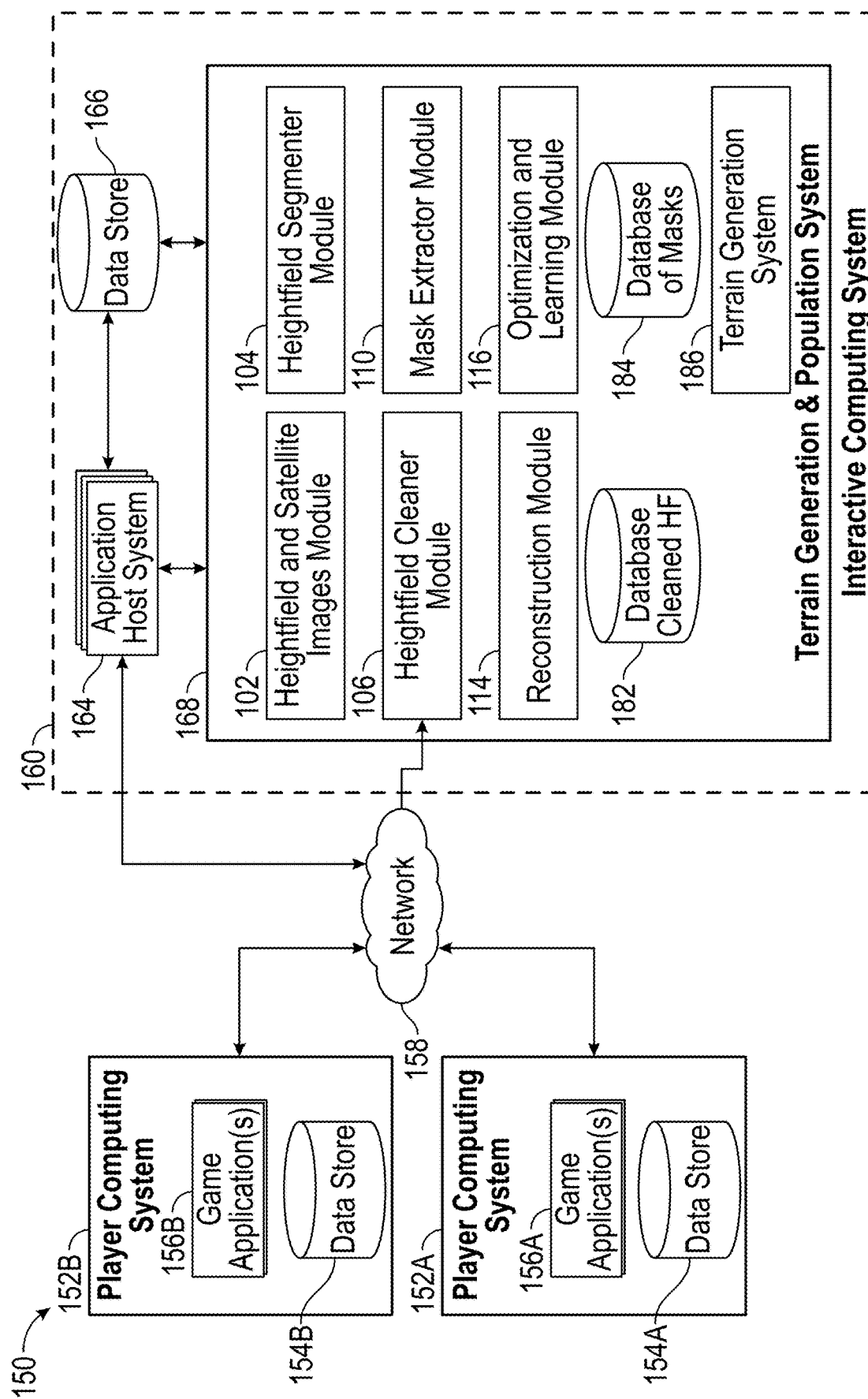
FIG. 1B illustrates an embodiment of a computing environment for implementing one or more embodiments of the terrain generation and population system.

FIG. 1B illustrates an embodiment of a computing environment 150 for implementing one or more embodiments of the present disclosure. The environment 150 includes a network 158, one or more player computing systems 152A, 152B (either of which may individually be referred to herein as player computing system 152), and an interactive computing system 160. To simplify discussion and not to limit the present disclosure, FIG. 1B illustrates only two player computing systems 152A, 152B and one interactive computing system 160, though multiple systems may be used.

The interactive computing system 160 can include application host systems 164, one or more data stores 166, and a terrain generation and population system 168. The terrain generation and population system 168 can communicate with data store 166 and/or with the application host systems 164 to acquire data associated with a game application. The terrain generation and population system 168 can additionally or alternatively communicate with a player computing system 152 and/or one or more third party data sources through the network 158. Although only one network 158 is illustrated, multiple distinct and/or distributed networks may exist. The various systems and other components illustrated in FIG. 1B, including interactions or communications between them, will now be described in more detail below.

A. Interactive Computing System

In the illustrated embodiment, the interactive computing system 160 includes application host systems 164, a data store 166, and a terrain generation and population system 168. These systems may communicate with each other. For example, the terrain generation and population system 168 can obtain data associated with a game application from the application host systems 164 and can provide object and/or feature data to the application host systems 164 and/or for storage in the data store 166. The application host systems 164 can communicate with the data store 166 to execute and/or host a game application. In certain embodiments, the interactive computing system 160 may be associated with a network-based service, which may be operated by a game publisher, game developer, platform provider or other entity.

1. Application Host Systems and/or Game Engine

The application host systems 164 can be configured to execute a portion of the game application 156A operating on the player computing system 152A and/or a host application (not illustrated) on the interactive computing system 160. Further details are described regarding the application host systems 164 below, but can be performed by another module, system, engine, or a combination thereof. In certain embodiments, the application host systems 164 may execute another application instead of or in addition to executing a portion of the game application 156A and/or a host application, which may complement and/or interact with the game application 156A during execution of a gameplay session of the game application 156A.

The interactive computing system 160 may enable multiple players or computing systems to access a portion of the game application(s) 156A and/or 156B and/or a host application. In some embodiments, the portion of a game application executed by application host systems 164 of the interactive computing system 160 may create a persistent virtual world. This persistent virtual world or virtual environment may enable one or more players to interact with the virtual world and with each other in a synchronous and/or asynchronous manner. In some cases, multiple instances of the persistent virtual world may be created or hosted by the interactive computing system 160. A set of players may be assigned to or may access one instance of the persistent virtual world while another set of players may be assigned to or may access another instance of the persistent virtual world.

In some embodiments, the application host systems 164 may execute a hosting system for executing various aspects of a game environment. For example, in one embodiment, the game application 156A and/or 156B may be a competitive game, such as a first person shooter or sports game, and the host application system 122 can provide a dedicated hosting service for hosting multiplayer game instances or facilitate the creation of game instances hosted by player computing devices. In some embodiments, the application host systems 164 can provide a lobby or other environment for players to virtually interact with one another. In some embodiments, the virtual environments may be populated with one or more virtual characters, objects, and/or features generated by the terrain generation and population system 168, as well as one or more characters, objects, and/or features designed by a game developer.

2. Terrain Generation and Population System

As will be described in further detail herein, the terrain generation and population system 168 can communicate with other systems to acquire media and other data, and may generate one or more custom three dimensional virtual representations of features and objects. The terrain generation and population system 168 can include one or more systems, subsystems or components for implementing various functionality described herein. For example, the terrain generation and population system 168 can include a heightfield and satellite images module 102, a heightfield segmenter module 104, a heightfield cleaner module 106, a mask extractor module 110, a reconstruction module 114, an optimization and learning module 116, a terrain generation system 186, a database of cleaned heightfield data 182, a database of masks 184, and/or the like. These example systems or components are not intended to be limiting, and the terrain generation and population system 168 may include fewer or more systems or components than illustrated or described.

The terrain generation and population system 168 and its various systems or components may be distributed across multiple computing systems. The various systems of the terrain generation and population system 168 can communicate with each other to obtain data, analyze data, and generate virtual object and/or scene data. While various systems are illustrated as part of the interactive computing system 160 and/or terrain generation and population system 168, it will be appreciated that each system's functionality could be implemented by a different or multiple computing systems or devices. Furthermore, a single system could implement functionality described herein as being provided or implemented by multiple systems in communication with each other. Similarly, functionality described as being provided by the terrain generation and population system 168 of the interactive computing system 160 could instead be implemented at a player computing system 152, in other embodiments. Each system or component of the terrain generation and population system 168 is described generally below, with associated functionality further described subsequently with respect to other figures.

a. Heightfield and Satellite Images Module

The heightfield and satellite images module 102 may be configured to capture and/or receive an image, such as a satellite image, depending on the embodiment. For example, as described further herein, the heightfield and satellite images module 102 may receive images (such as a top view of a colored geographical area, videos and/or other media items or files from the player computing systems 152A or 152B, and/or other source. The heightfield and satellite images module 102 may be configured to communicate via various APIs or other protocols specific to a particular service or system that stores particular media data.

In some embodiments, the heightfield and satellite images module 102 can receive heightfield data. The heightfield data can correspond to at least a portion of the same geographical region as the satellite image. The heightfield and satellite images module 102 can identify correlations between the satellite image and the heightfield image, such as on a pixel-by-pixel basis. The heightfield and satellite images module 102 can transmit the heightfield image and/or the satellite image to one or more other modules, such as the heightfield segmenter module 104.

b. Heightfield Segmenter Module

The heightfield segmenter module 104 may be configured to categorize the pixels and/or a group of pixels in the satellite or heightfield image in order to determine corresponding masks to apply, depending on the embodiment. For example, pixels may be grouped automatically and/or manually using a tool in game applications 156, and the heightfield segmenter module 104 can categorize the groups of pixels. In some embodiments, the heightfield segmenter module 104 can categorize one or more pixels individually. The heightfield segmenter module 104 can categorize each pixel individually, such as a single pixel as a forest pixel, and a single pixel as a highway pixel. The heightfield segmenter module 104 can categorize groups of pixels. For example, the heightfield segmenter module 104 can identify a group of pixels as corresponding to a forest, and a group of pixels for a building. As described further herein, the heightfield segmenter module 104 may identify certain regions as a forest category, roads category, low vegetation category, buildings category, and/or the like. The heightfield segmenter module 104 may be configured to communicate via various APIs or other protocols specific to a particular service or system to retrieve, process, or transmit data.

In some embodiments, the heightfield segmenter module 104 can identify categories at a granular level. For example, the heightfield segmenter module 104 can identify a cluster of pine trees in a certain area at a certain height and length, a trunk diameter, a leaf density, distance between the pine trees within the cluster, and/or the like. The heightfield segmenter module 104 can perform categorization based on pixel color value. For example, a darker green color can indicate an amazon rainforest, whereas a collage of colors can indicate a North American forest in autumn. The heightfield segmenter module 104 can identify categorize the data based on height data. For example, the heightfield segmenter module 104 can identify that an apple tree is typically of a certain width with a certain tree trunk diameter based on the height data. The heightfield segmenter module 104 can perform categorization based on edge detection. The heightfield segmenter module 104 can identify four edges forming a square and height data within the square that is much higher than the surrounding heights, and can categorize the pixels as a sky scraper.

In some embodiments, the heightfield segmenter module 104 can receive heightfield and/or satellite data from the heightfield and satellite images module 102. The heightfield segmenter module 104 can segment the satellite images based on the identified categories. The heightfield segmenter module 104 can process the images through a neural network to identify categories on a pixel-by-pixel basis. The heightfield segmenter module 104 can transmit the categorized heightfield data to the mask extractor module 110.

c. Heightfield Cleaner Module

The heightfield cleaner module 106 may be configured to remove features and/or objects from the heightfield data in order to generate a clean heightfield. For example, as described further herein, the heightfield cleaner module 106 may pass the heightfield data to a frequency filter, a neural network, and/or the like. The heightfield cleaner module 106 may be configured to communicate via various APIs or other protocols specific to a particular service or system to retrieve, process, or transmit data.

In some embodiments, the heightfield cleaner module 106 can receive heightfield data from the heightfield and satellite images module 102. The heightfield cleaner module 106 can clean the heightfield data to generate a cleaned heightfield. The heightfield cleaner module 106 can transmit the cleaned heightfield to the mask extractor module 110.

d. Mask Extractor Module

The mask extractor module 110 may be configured to apply masks corresponding to certain categories to the cleaned heightfield. For example, as described further herein, the mask extractor module 110 can identify certain categories of the image, such as a forest category, roads category, low vegetation category, buildings category, and/or the like on a pixel basis, for groups of pixels, and/or the like. The mask extractor module 110 can then apply corresponding masks for the pixels associated with each category. The mask extractor module 110 may be configured to communicate via various APIs or other protocols specific to a particular service or system to retrieve, process, or transmit data. In some embodiments, the mask extractor module 110 can apply masks more granularly. For example, the mask extractor module 110 can apply one mask for a 40 feet high 3 feet tree trunk diameter pine tree, and another mask for a 20 feet high 1 foot tree trunk diameter pine tree.

In some embodiments, the mask extractor module 110 can apply one or more masks to the same pixel and/or group of pixels. For example, the mask extractor module 110 can apply a first mask to a certain area indicating a forest, a second mask indicating pine trees in the same area, a third mask indicating a certain height of the objects in the area, a fourth mask indicating a density metric for objects in the area, and/or the like.

In some embodiments, the mask extractor module 110 can receive a cleaned heightfield from the heightfield cleaner module 106. The mask extractor module 110 can receive the identified categories for the heightfield and/or satellite image from the heightfield segmenter module 162. The mask extractor module 110 can apply the masks to the cleaned heightfield according to the identified corresponding categories. The mask extractor module 110 can apply the masks on a pixel-by-pixel basis. The mask extractor module 110 can transmit the cleaned heightfield with the applied masks to the reconstruction module 114.

e. Reconstruction Module

The reconstruction module 114 may be configured to generate terrain data based on the cleaned heightfield with the applied masks corresponding to certain categories. For example, as described further herein, the reconstruction module 114 can generate three dimensional virtual representations of features and/or objects for certain categories, such as trees for a forest category, roads and highways for a roads category, and/or the like. The reconstruction module 114 can then place the three dimensional virtual representations of features and/or objects in a three dimensional virtual space according to terrain population rules. The reconstruction module 114 may be configured to communicate via various APIs or other protocols specific to a particular service or system to retrieve, process, or transmit data.

In some embodiments, the reconstruction module 114 can receive a cleaned heightfield with the applied masks from the mask extractor module 110. The reconstruction module 114 can generate a three dimensional virtual space, and generate three dimensional virtual representations of features and/or objects corresponding to categories identified in the heightfield data. The reconstruction module 114 can place the three dimensional virtual representations of features and/or objects into the three dimensional virtual space corresponding to the locations of the masks for the categories. The reconstruction module 114 can generate a top view of the three dimensional virtual space and transmit the top view to the optimization and learning module 116.

f. Optimization and Learning Module

The optimization and learning module 116 may be configured to compare the top view of the three dimensional virtual space with the original satellite image to determine a difference and/or an error. The optimization and learning module 116 can determine whether the difference, metric, characteristic, and/or error meets a threshold. For example, the optimization and learning module 116 can identify a metric of how similar the top view of the three dimensional virtual space is with the original satellite image (e.g., 95% similarity). If the metric meets a threshold, the optimization and learning module 116 can save the terrain population rules to be applied at a later time. For example, if the difference between the top view of the three dimensional virtual space is less than 5% difference to the original satellite image, then the optimization and learning module 116 can save the terrain population rules. In some embodiments, meeting a threshold can include satisfying a rule, such as 95% similarity or greater. In some embodiments, meeting a threshold can include not satisfying a rule, no less than 5% difference. If the metric do not meet the threshold, the modules can be adjusted. The optimization and learning module 116 may be configured to communicate via various APIs or other protocols specific to a particular service or system to retrieve, process, or transmit data.

In some embodiments, the optimization and learning module 116 can receive the top view of the three dimensional virtual space from the reconstruction module 114. The optimization and learning module 116 can receive the original satellite image from the heightfield and satellite images module 102. The optimization and learning module 116 can compare the top view and the satellite image, such as on a pixel by pixel basis. The optimization and learning module 116 can determine that the difference meets a threshold and save the terrain population rules to be used in an inference operation, such as in FIG. 2. The optimization and learning module 116 can determine that the difference is not met, and can adjust certain modules, such as readjusting weights of a neural network.

g. Database of Cleaned Heightfield

The database of cleaned heightfield data 182 can be configured to store data for heightfields that have been cleaned by the heightfield cleaner module. The database of cleaned heightfield data 182 can store executable code, such as the machine learning modules that can be used by the heightfield cleaner module 106. The database of cleaned heightfield data 182 may be distributed across multiple computing devices (see, for example, computing device 10 in FIG. 7). In some embodiments, the database of cleaned heightfield data 182 may be network-based storage system where data may be stored in different locations.

h. Database of Masks

The database of masks data 184 can be configured to store data for masks to apply to the clean heightfield. The database of masks data 184 can store executable code, such as the modules that can be used to apply the masks to the cleaned heightfield by the mask extractor module 110. The database of masks data 184 may be distributed across multiple computing devices (see, for example, computing device 10 in FIG. 7). In some embodiments, the database of masks data 184 may be network-based storage system where data may be stored in different locations.

i. Data Store of Interactive Computing System

The interactive computing system 160 can include a data store 166. The data store 166 can be configured to store data acquired by other systems, such as, for example, telemetry data, video data, game state information, user data, or the like. In some embodiments, the data store 166 may store user account data associated with a video game publisher, a game platform provider or other service that enables a user to maintain preferences, virtual characters, avatars, achievements, and/or other data across a plurality of different video games. The data store 166 may be distributed across multiple computing devices (see, for example, computing device 10 in FIG. 7). In some embodiments, the data store 166 may be network-based storage system where data may be stored in different locations.

j. Optimization and Learning Module

The terrain generation system 186 may be configured to generate terrain data for use in a video game. For example, the terrain generation system 186 can receive a cleaned heightfield with applied masks, or a heightfield generated by a game developer with applied masks, and generate a three dimensional virtual space. The terrain generation system 186 can generate three dimensional virtual representations of features and/or objects corresponding to masks. The terrain generation system 186 can then place the three dimensional virtual representation of features and/or objects in the three dimensional virtual space based on terrain population rules. The terrain generation system 186 may be configured to communicate via various APIs or other protocols specific to a particular service or system to retrieve, process, or transmit data.

B. Player Computing System

Each of the player computing system 152A and player computing system 152B (each individually referred to as player computing system 152) can be controlled by a user, such as a game developer of a video game. The player computing system 152 may include hardware and software components for establishing communications over a communication network 158. For example, the player computing system 152 may be equipped with networking equipment and network software applications (for example, a web browser) that facilitates communications via one or more networks (for example, the Internet or an intranet). The player computing system 152 may have varied local computing resources such as central processing units and architectures, memory, mass storage, graphics processing units, communication network availability and bandwidth, and so forth. Further, the player computing system 152 may include any type of computing system. For example, the player computing system 152 may include any type of computing device(s), such as desktops, laptops, game application platforms, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the player computing system 152 may include one or more of the components or embodiments described below.

1. Game Application(s) and Host Application System

The player computing system 152 is capable of executing one or more game applications 156 (shown as 156A and 156B on different player computing systems 152A and 152B), which may be stored and/or executed locally and/or in a distributed environment. The game applications 156 can include an instance of a video game and/or a game development environment. In a locally executed game application 156, generally, the game does not rely or utilize an external computing system (for example, the interactive computing system 160) to execute the game application. In some instances, a locally executable game can communicate with an external server to retrieve information associated with the game, such as game patches, game authentication, clouds saves, custom virtual character data, user account data, or other features. In distributed game applications, the player computing system 152 may execute a portion of a game and the interactive computing system 160, or an application host system 122 of the interactive computing system 160 may execute another portion of the game. For instance, the game may be a massively multiplayer online role-playing game (MMORPG) that includes a client portion executed by the player computing system 152 and a server portion executed by one or more application host systems 164. For the present discussion, the type of game application 156 can be a locally executable game, a distributed application, or an application that includes a portion that executes on the player computing system 152 and a portion that executes on at least one of the application host systems 164.

2. Player Data Store

The player computing system 152 can include a data store 154 (shown as 154A and 154B on different player computing systems 152A and 152B). The data store 154 can be configured to store data associated with one or more game applications 156, local account data associated with an account maintained for the player and/or game developer by the interactive computing system 160, virtual characters or features/objects created by the player or game developer that are usable in one or more games, and/or other game-related or account-related data. The data store 154 may be distributed across multiple computing devices (see for example computing device 10 in FIG. 7).

C. Other Considerations

Although the various systems are described separately above, it should be noted that one or more of these systems may be combined together. For example, the interactive computing system 160 may provide functionality similar to one or more player computing systems 152. Additionally, one or more of the systems may be executed by the same computing device (see for example, computing device 10 in FIG. 7) or by a different computing system than illustrated in FIG. 1B. For example, the terrain generation and population system 168 may be executed on the same computing device as the player computing system 152. On the other hand, one or more systems may be executed by multiple computing devices. For example, a portion or subsystem of the terrain generation and population system 168 may be implemented by a player's personal computer or the player computing system 152 while another portion or subsystem may be implemented by a server.

Applying a Terrain Generation System Block Diagram

Figure 2:
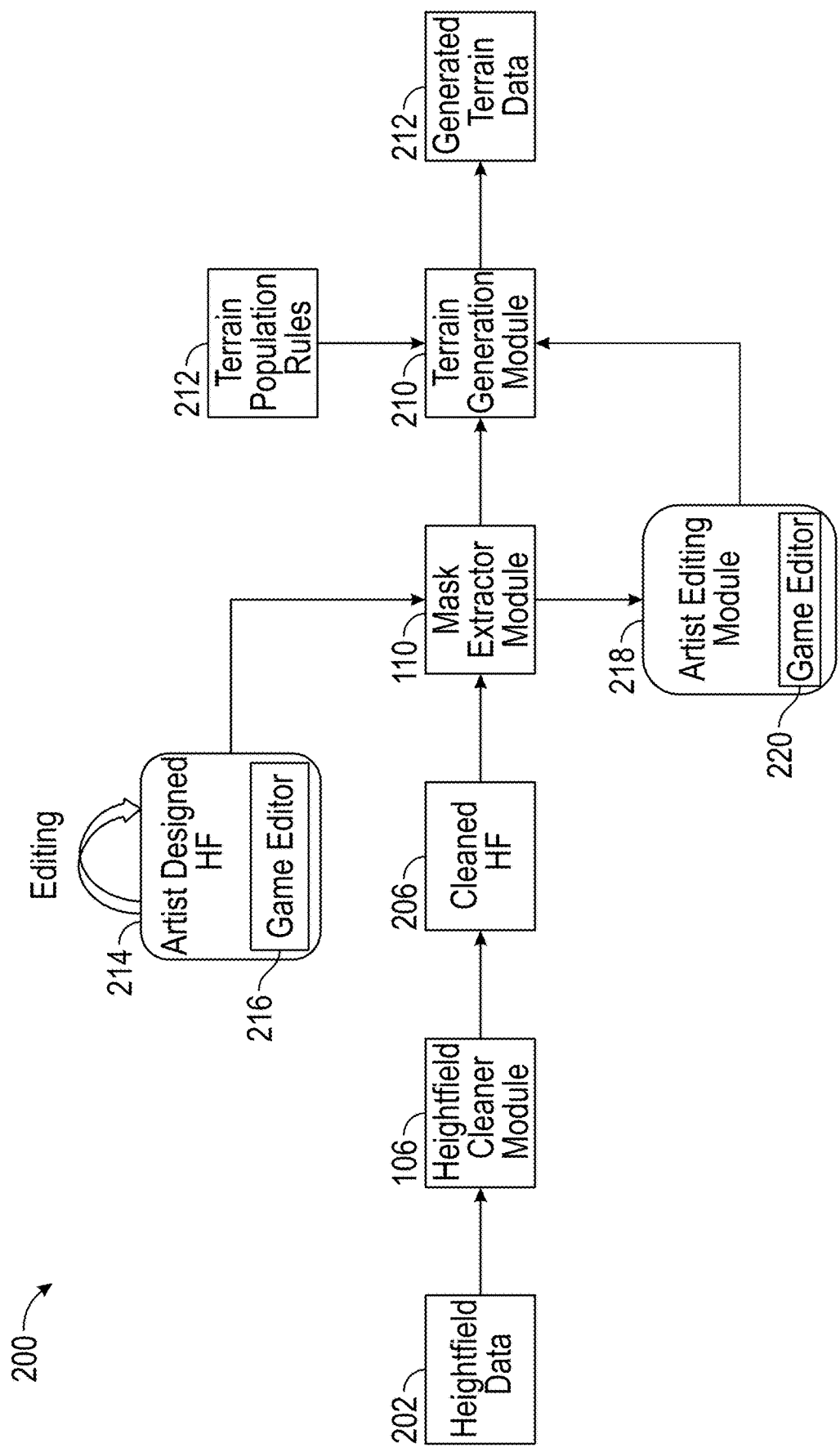
FIG. 2 provides a block diagram for applying a terrain generation and population system and associated data flow.

FIG. 2 provides a block diagram for applying a terrain generation and population system 200 and associated data flow. In the illustrated embodiment, the terrain generation and population system 200 can include a heightfield cleaner module 106, a mask extractor module 110, a terrain generation module 210, and an artist editing module 218. The terrain generation and population system 200 can access and/or generate heightfield data 202, a cleaned heightfield 206, artist designed height field 214, terrain population rules 212, and generated terrain data 214. In some embodiments, the terrain generation and population system 200 can include more or less components. In some embodiments, the features described for the modules described for FIG. 2 can include one or more features for the modules described for FIG. 1A or 1B. For example, the frequency filter described for heightfield cleaner module 106 in FIG. 2 can include one or more features for the frequency filter described for heightfield cleaner module 106 in FIG. 1A, and/or vice versa.

In some embodiments, the terrain generation and population system 200 can receive height field data 202 as an input, such as real world height field data. The terrain generation and population system 200 can receive the height field data 202 from a module, such as the height field and satellite images module 102 of FIG. 1A. The heightfield cleaner module 106 can process the heightfield data 202 to generate a cleaned height field 206. The heightfield cleaner module 106 can process the height field data 202 by applying a frequency filter or through an encoder-decoder neural network to remove or reduce objects and features in the images. The heightfield cleaner module 106 can apply one or more features of the heightfield cleaner module 106 in FIG. 1A, and/or vice versa.

In some embodiments, the terrain generation and population system 200 can use artist designed heightfields 214. For example, the terrain generation and population system 200 can include a game editor 216 that allows artists to manually design heightfields for three dimensional virtual game terrain generation. The game editor 216 can enable a game developer to generate a height field, such as based on a sketch created in the game editor 216. Examples, embodiments, and features of height field generation are described in more detail in the Patent Application titled "Terrain Generation System" (U.S. patent application Ser. No. 16/271,655, filed Feb. 8, 2019), the disclosures of which is hereby incorporated by reference in its entirety.

In some embodiments, the mask extractor module 110 can extract masks to apply to the cleaned heightfield 206. The mask extractor module 110 can identify masks for certain areas on the heightfield. For example, the mask extractor module 110 and/or other module can categorize each pixel in the cleaned heightfield to correspond to roads, trees, waterways, buildings, vegetation, and/or the like, and can apply masks for these categories. The mask extractor module 110 can include one or more features of the mask extractor module 110 of FIG. 1A, and/or vice versa. The mask extractor module 110 can output the cleaned heightfield 206 with the applied masks to a terrain generation module 210. For example, the mask extractor module 110 can apply a forest mask to the third side of the image, and a lower vegetation mask in the second of the image, and a building mask to the first side of the image.

After masks are generated by the mask extractor module 110, a game developer can edit the masks via a game editor 220 in the artist edition module 218. The game developer can add, remove, modify, and/or change the masks that were applied by the mask extractor module 110.

In some embodiments, the terrain generation module 210 can generate terrain data 214 based on the cleaned heightfield 206 with the applied masks received from the mask extractor module 110. The terrain generation module 210 can generate three dimensional virtual representations of features and objects and place them in a three dimensional virtual space. The placement of the features and objects can correlate with the location of the masks on the cleaned heightfield 206. For example, the terrain generation module 210 can identify that the third side of the image includes a forest mask. The terrain generation module 210 can generate three dimensional virtual representations of trees and place them in a virtual space that corresponds to the third side of the image.

In some embodiments, the terrain generation module 210 can place the three dimensional virtual representations of objects and features based on terrain population rules 212. The terrain population rules 212 can include one or more terrain population rules 118 of FIG. 1A, and/or vice versa. The terrain population rules 212 can include a type of terrain, feature, or object, such as a type of tree. For example, the terrain population rules 212 can include for a certain forest category to include a density of five hundred to a thousand trees per square mile. The terrain population rules 212 can include placement rules or feature/object terrain population rules, such as an average distance between objects (e.g., trees). For forest category example above, the terrain population rules 212 can include separating trees by a distance between 1-3 feet based on a random number generator, or set to 2 feet. The terrain population rules 212 can include varying shapes and sizes (e.g., tree height and width). The terrain population rules 212 can include including one tree with a diameter trunk of 1 yard for every three trees with a diameter of 1 feet.

In some embodiments, the terrain population rules 212 can include a rule for one or more features of the objects and/or categories. For example, the terrain population rules 212 can include identifying a three dimensional digital representation of an tree typical for an area in a small town in France that is 40 feet tall, 20 feet wide, colored leaves for autumn time, and/or the like. In some embodiments, the terrain population rules 212 can include a plurality of separate rules for features and objects. For example, a first terrain population rule can include a feature height (e.g., 1000 feet high), a second terrain population rule can include a feature type (e.g., a sky scraper), a third terrain population rule can include a feature color (e.g., light blue), and/or the like.

In some embodiments, the terrain population rules 212 can include the identification of feature characteristics. For example, the terrain population rules 212 can analyze height field data with applied masks that correspond to broad categories, such as a low vegetation mask and a highway mask. The terrain population rules 212 can identify the type of vegetation to be applied in the area where the low vegetation mask is applied. For example, the terrain population rules 212 can perform further analysis by analyzing height data with the low vegetation mask to identify the type of bushes to add to the three dimensional digital space, and where to place the bushes based on matching height data of the low vegetation mask area to a model of height data for a bush.

In some embodiments, the terrain generation module 210 can retrieve terrain population rules 212 for a particular category, identify locations on the cleaned heightfield 206 that include masks corresponding to the particular category, and place the three dimensional virtual representations of objects and features for the category in the identified locations based on the terrain population rules. For example, the terrain generation module 210 can determine that the category is forest. The terrain generation module 210 can access terrain population rules for a forest In some embodiments, the terrain population rules 212 can be adjusted based on a characteristic of the terrain, such as by elevation (e.g., higher elevation has a lower density of trees). In some embodiments, the terrain population rules 212 can be adjusted based on neighboring terrain categories (e.g., a forest mask that is next to a building mask maintains tree density up to the border, but a forest mask next to a body of water reduces in tree density towards the border). In some embodiments, terrain population rules 212 can include distribution rules, such as a tree distribution along a road or waterway mask. In some embodiments, terrain population rules 212 can include density rules, such as a dense road network for dense building masks. In some embodiments, terrain population rules 212 can include distance rules, such as distributing a crop area far from a high-density building mask.

Figure 3:
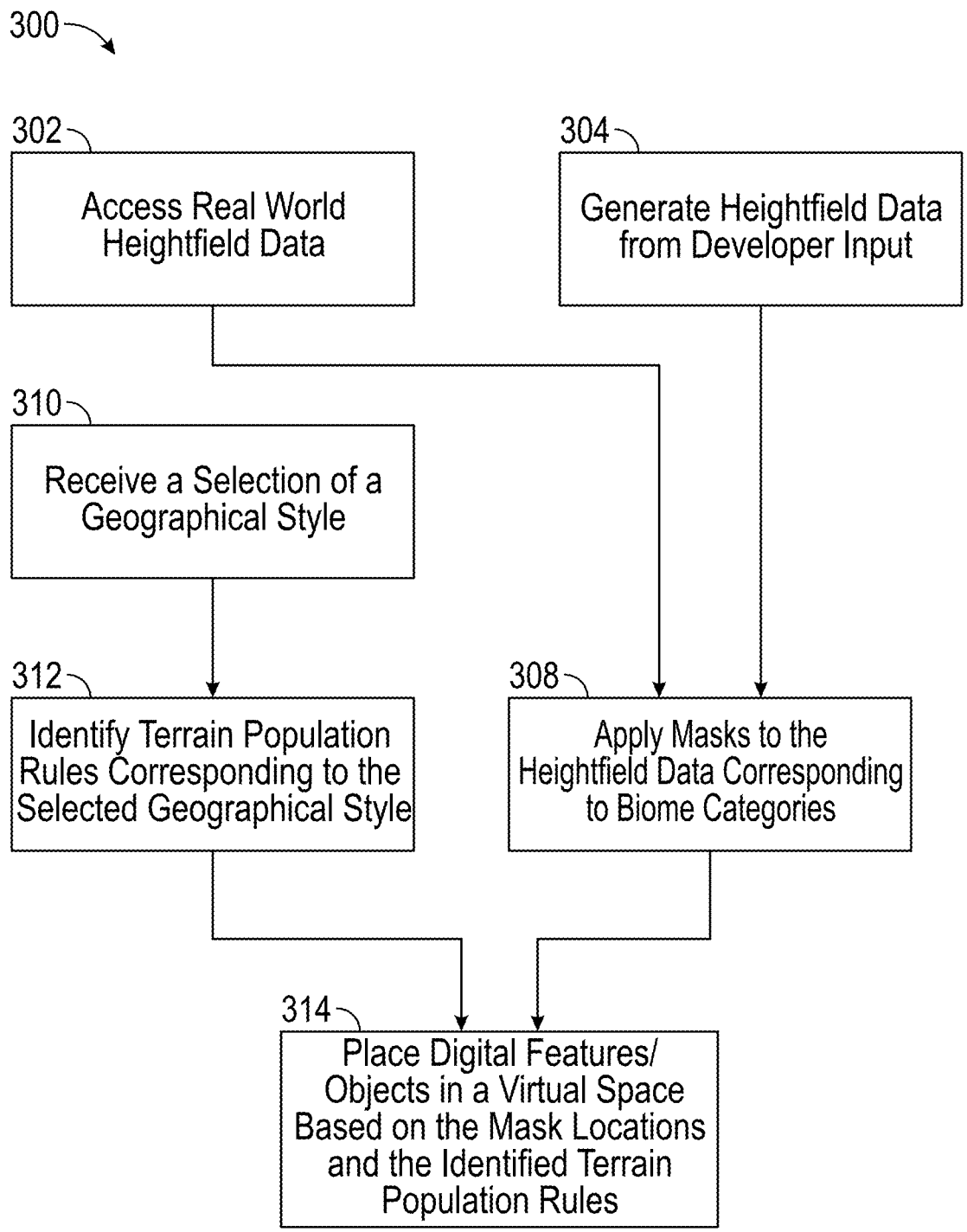
FIG. 3 provides a flow diagram for generating and populating terrain based on a style.

Terrain Generation and Terrain Population Based on Geographical Style Flow Diagram FIG. 3 provides a process 300 for generating and populating terrain based on a style. The process 300 can be implemented by any system that can generate and/or populate terrain data. For example, the process 300, in whole or in part, can be implemented by the reconstruction module 114, or other computing system. Although any number of systems, in whole or in part, can implement the process 300, to simplify discussion, the process 300 will be described with respect to particular systems. Further, although embodiments of the process 300 may be performed with respect to variations of systems comprising various game development environments and/or game engines, to simplify discussion, the process 300, will be described with respect to the terrain generation and population system.

At block 302, the terrain generation and population system can access real world heightfield data. The terrain generation and population system can access a database of heightfield data for a geological location. For example, the terrain generation and population system can identify a location, such as a selected geographical location, and the terrain generation and population system can access the heightfield data of the selected geographical location.

At block 304, the terrain generation and population system can enable a game developer to generate heightfield data. For example, the terrain generation and population system can include a game editor where a game developer can sketch drawings and/or generate heightfield data via the game editor.

At block 308, the terrain generation and population system can apply masks to the heightfield data corresponding to biome categories. The terrain generation and population system can identify categories, such as biome categories in the heightfield data, and the terrain generation and population system can identify corresponding masks for the identified categories. The masks on the height field indicate here the digital features and objects are to be placed. For example, a first portion of the heightfield data can correspond to a forest, and a forest mask can be applied to the first portion. Later in this process, digital objects, such as trees, can be applied to a location in three dimensional space that corresponds to the location of the forest mask. The terrain generation and population system can apply the masks onto the heightfield data and/or generate a layer for each mask.

At block 310, the terrain generation and population system can receive a selection of a style, such as a typical style of a geographical location. For example, the terrain generation and population system can receive a selection of a geographical location from a game developer system, and the terrain generation and population system can identify that the geographical location is in a certain area, such as Europe or America, and that certain features and/or objects are prevalent in the area, such as buildings of a certain European or American style. The style selection can include styles of terrain, such as a terrain style of a certain game (e.g., the style of a previous version of a game to generate terrain for a subsequent version of the game). The style selection can include terrain characteristics, such as a heavily populated terrain with a high density of features and/or objects. The style selection can include an aesthetic style, such as a color scheme for the terrain.

At block 312, the terrain generation and population system can identify terrain population rules corresponding to the selected style, such as the geographical style. The terrain generation and population system can access a style library that includes terrain population rules for certain styles. The style can include a district type, such as a commercial district, a residential district, or a corporate district.

In some embodiments, the game developer can select certain areas for certain styles. For example, the game developer can select the third section to be a Rocky mountain style, the second section to be a residential district, and the third section to be a commercial district of Paris.

In some embodiments, the styles can be generated by neural networks trained to generate the terrain population rules for the particular style. For example, the terrain generation and population system can generate terrain population rules for Los Angeles, California based on satellite images and heightfield data for Los Angeles.

In some embodiments, the terrain generation and population system can identify terrain population rules corresponding to the selected style. For a European style, the terrain generation and population system can identify certain types of buildings that are common in the geographical location, the density of buildings, the distances between the buildings, and/or the like for that geographical location and for a city category. The terrain generation and population system can determine layouts for the terrain based on the style. For example, roads in rural parts of Southeast Asia may have more unpaved dirt roads, as compared to capital cities.

At block 312, the terrain generation and population system can place digital three dimensional representation of features and/or objects into a three dimensional virtual space based on the mask locations and the identified terrain population rules. In some embodiments, the terrain generation and population system can recreate three dimensional virtual representation of a real world, such as based on the real world heightfield data retrieved at block 302. The terrain generation and population system can perform edge detection for placement of features or objects into the virtual space. For example, the terrain generation and population system can identify four edges that make a square to determine a boundary for a building or sample points for tree location. The terrain generation and population system can perform curve fitting for certain features, such as lines identified for roads and/or rivers.

In some embodiments, the terrain generation and population system can generate three dimensional virtual representation of a new terrain, such as based on the generated heightfield data from developer input at block 304. The terrain generation and population system can compute density of features and/or objects with respect to heights and slopes of a similar location. For example, if a road mask is wide, the terrain generation and population system can generate a multi-lane highway with ample shoulder space on both sides.

Image Segmentation Example

Figure 4A:
FIG. 4A provides a satellite image for a geographical location.
Figure 4B:
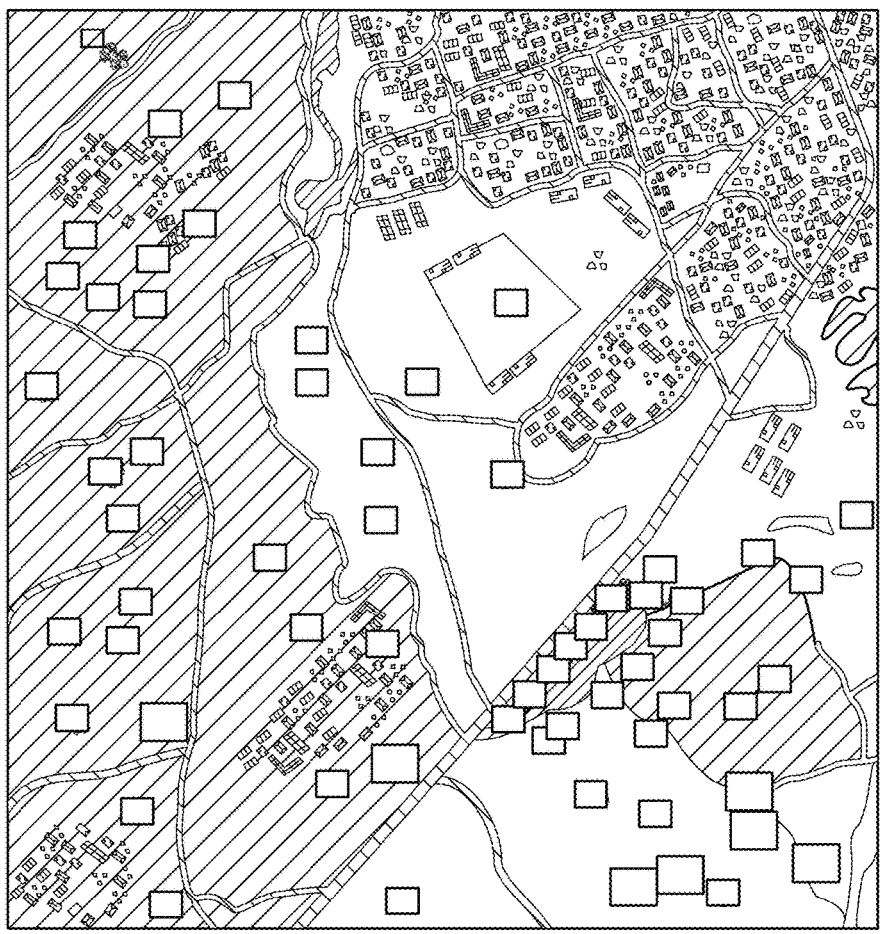
FIG. 4B illustrates an example of a segmented image of the satellite image of FIG. 4A illustrating various feature and/or object categories.
Figure 4C:
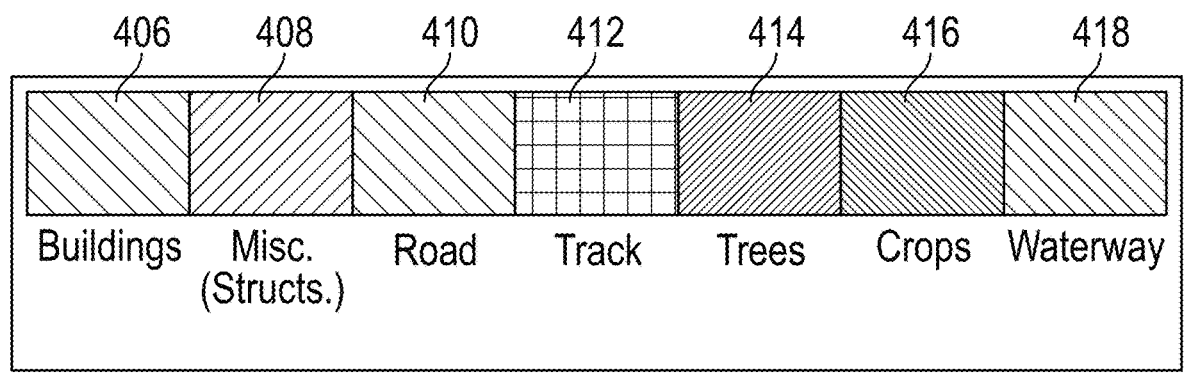
FIG. 4C illustrates a legend for various feature and/or object categories illustrated in FIG. 4B.

FIGS. 4A-4C provide examples of image segmentation. FIG. 4A provides a satellite image 400 for a geographical location. The satellite image and a heightfield image (not shown) can be processed by a machine learning algorithm, such as an encoder-decoder neural network, to identify categories for each pixel in the satellite image 400. For example, the terrain generation and population system can determine that a blue color in the satellite image indicates a higher probability of water, and that if the blue color forms in a line, that the blue is likely a river. But if the blue color forms a certain area, that the blue is likely a pond or a lake.

In some embodiments, the terrain generation and population system can assess the height of the pixel and/or its surrounding pixels to make its determination. For example, if the blue pixel area is surrounded by higher pixels, the terrain generation and population system can determine that the blue area is a valley. If there are sharp distinctions in height, such as a high rectangular blue area, with lower surrounding areas, then the terrain generation and population system can identify the blue area as the top of a building instead of water.

FIG. 4B illustrates an example of a segmented image 450 of the satellite image 400 of FIG. 4A where each pixel corresponds to a feature and/or object category. In some embodiments, the segmented image 450 can include category information to the satellite image and/or the heightfield image. Each pixel of the heightfield and/or satellite image can correspond to a feature and/or object category.

FIG. 4C illustrates a legend for various feature and/or object categories illustrated in FIG. 4B. The segmented image 450 can include pixels that correspond to certain feature or object types, such as buildings 406, structures 408, roads 410, track 412, trees 414, crops 416, waterways 418, and/or the like. The segmented image 450 can be generated by the heightfield segmenter module 104 of FIG. 1A.

Terrain Population Example

Figure 5A:
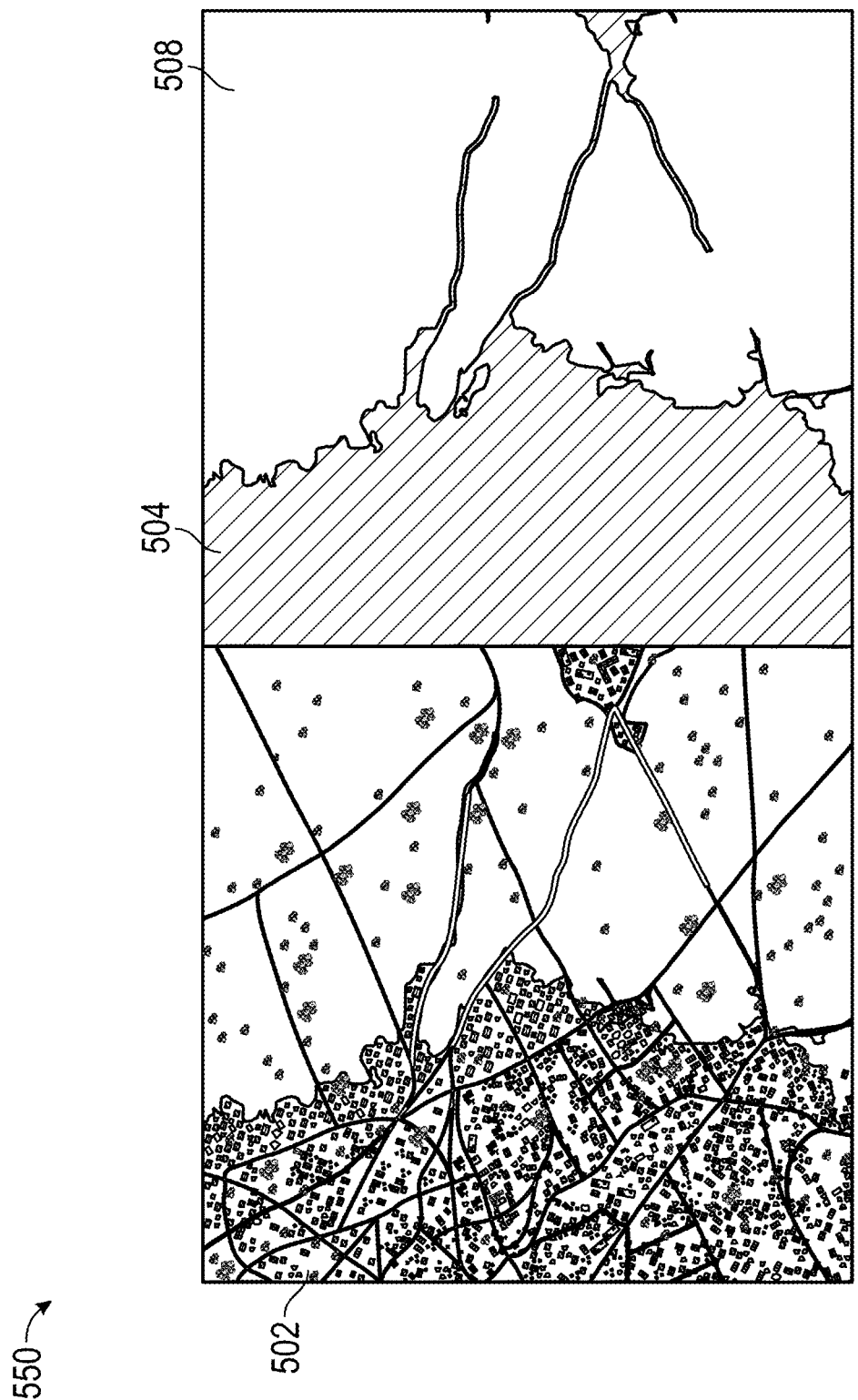
FIG. 5A provides an example of identifying a mask for a particular category.

FIG. 5A provides an example 500 of identifying a mask for a particular category. The terrain generation and population system can receive a satellite image 502 of a particular location. The terrain generation and population system can segment the satellite image 502 to identify certain biome categories within the satellite image 502. The terrain generation and population system can apply masks to the satellite image 502 and/or a heightfield image (now shown).

In some embodiments, the terrain generation and population system can identify a category and apply a mask 504 to the image. In some embodiments, a mask 504 can include a layer corresponding to the terrain category. In other embodiments, a mask 504 can include an exclusion corresponding to the terrain category. The terrain generation and population system can populate the unmasked portion 508 with features and/or objects corresponding to the identified category.

Figure 5B:
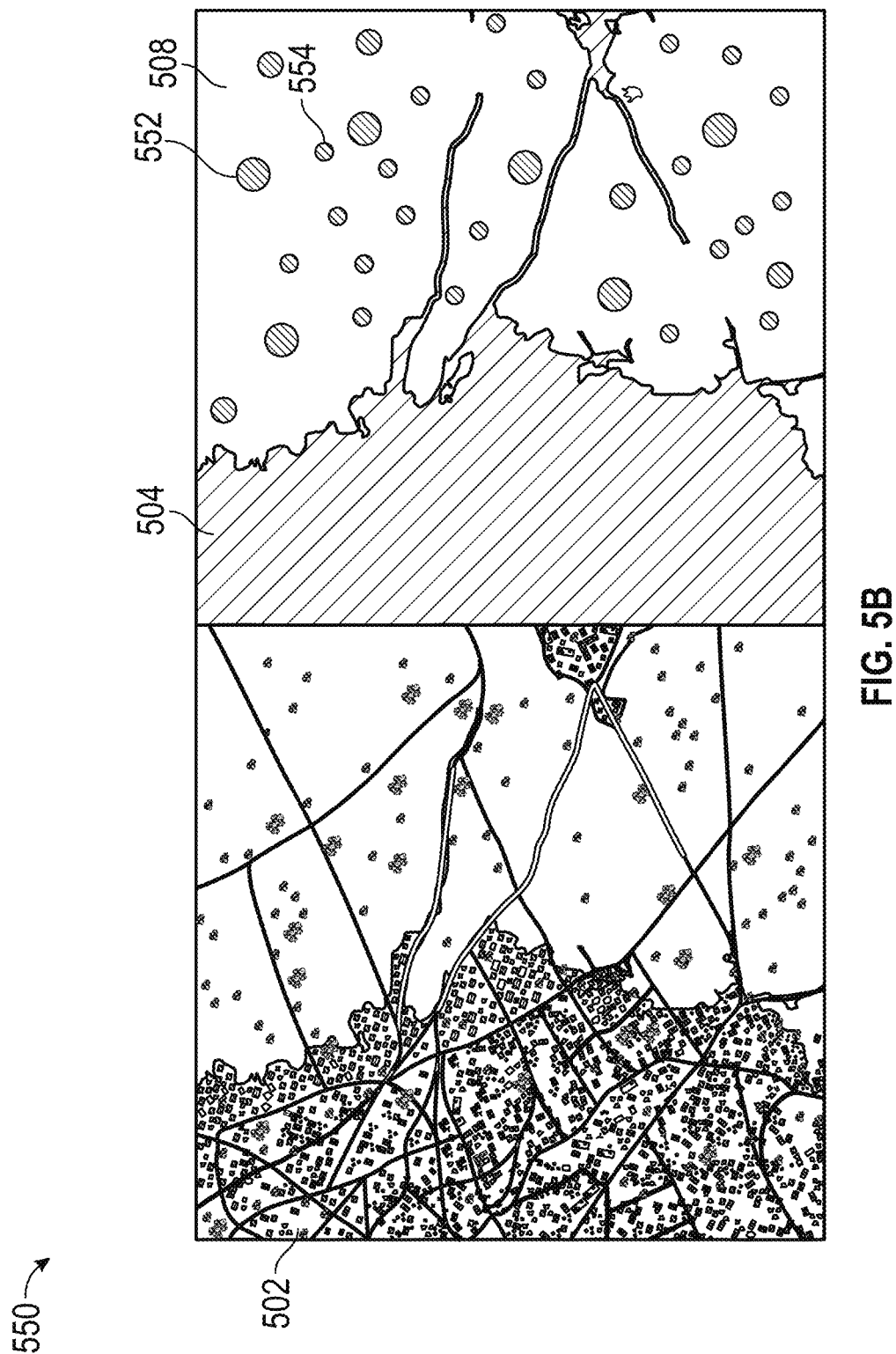
FIG. 5B provides an example of terrain population.

FIG. 5B provides an example 550 of terrain population. The terrain generation and population system can identify terrain population rules for the type of category. For example, the mask 504 that is applied to the heightfield data can correspond to a low vegetation category. The terrain generation and population system can identify terrain population rules particular for the low vegetation category.

The terrain generation and population system can apply terrain population rules to the unmasked portion 508 of the heightfield image. The terrain generation and population system can identify certain areas 552, 554 in the unmasked portion 508 of the heightfield image based on the application of the terrain population rules to the unmasked portion 508. For example, the top of the unmasked portion 508 shows a relatively large area of low vegetation. The terrain population rules indicate placement of low vegetation in smaller areas, such as area 554, and in larger areas, such as area 552. The terrain generation and population system can generate three dimensional virtual representations of low vegetation and place them into the areas 552, 554. The terrain population rules can indicate that the areas, such as areas 552, 554, are to be of a certain size (e.g., radius), at certain distances from other areas, at certain distances from the edge of a mask, and/or the like. The size of the areas, such as areas 552, 554, can indicate characteristics of the three dimensional virtual representations of the features and/or objects to be placed. For example, a larger area can indicate thicker vegetation type, higher vegetation density, color of the three dimensional virtual representations of the features and/or objects, and/or the like.

Example of Automated Terrain Population

Figures 6A, 6B:
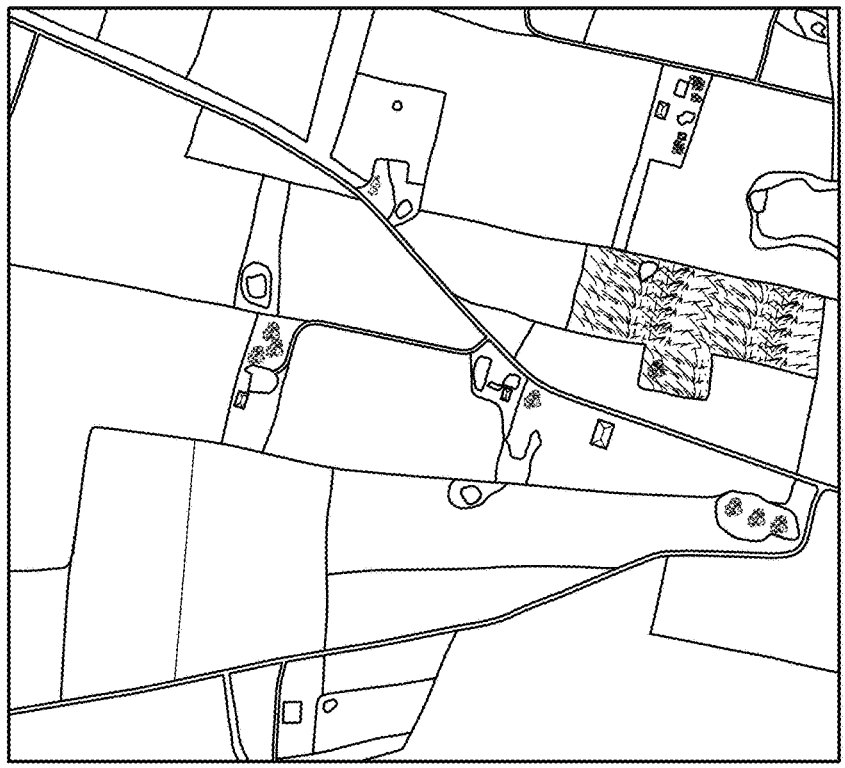
FIG. 6A provides an example of a satellite map image.
FIG. 6B provides an example of point cloud data.

FIG. 6A provides an example of a satellite map image 600. The satellite map image 600 can be received from an input interface module, such as an input interface module of the heightfield and satellite images module 102 of FIG. 1A. The map image can include a two dimensional gray image where the pixel value for each pixel corresponds to the height for that pixel.

FIG. 6B provides an example of point cloud data 610. In some embodiments, a map image, such as the satellite map image 600, can be converted to point cloud data, such as the point cloud data 610 of FIG. 6B. The conversion can include converting the two dimensional gray image to point cloud data 610 that can include a three dimensional mesh and corresponding vertices. In some embodiments, the heightfield and satellite images module 104 can convert the map image to point cloud data to be segmented by the heightfield segmenter module 104 and cleaned by the heightfield cleaner module 106.

Figure 6C:
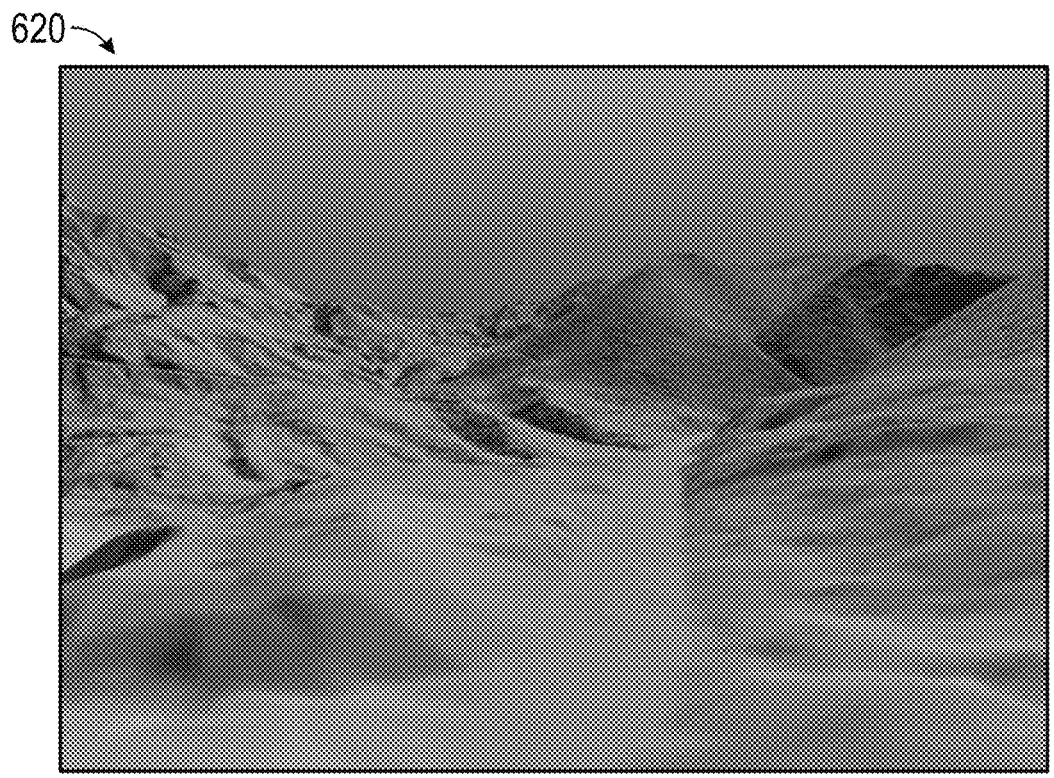
FIG. 6C provides an example of filtered point cloud data.

FIG. 6C provides an example of filtered point cloud data 620. In some embodiments, the point cloud data can be filtered, such as by removing objects or features in the point cloud data 620. The point cloud data can be filtered by the heightfield cleaner module 106 of FIG. 1A. The filtered point cloud data 620 can be generated by applying a filter, such as a frequency filter, to extract filtered point cloud data 620 that includes only the ground data.

Figure 6D:
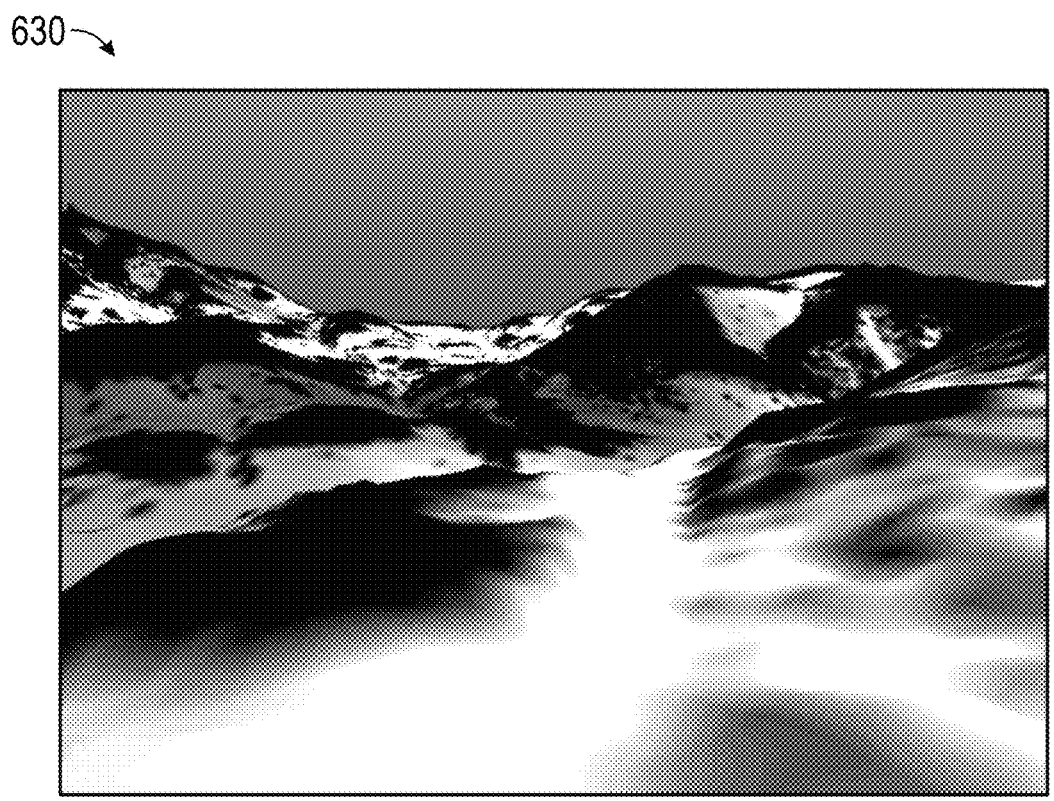
FIGS. 6D and 6E provide examples of vegetation masks applied to filtered point cloud data.
Figure 6E:
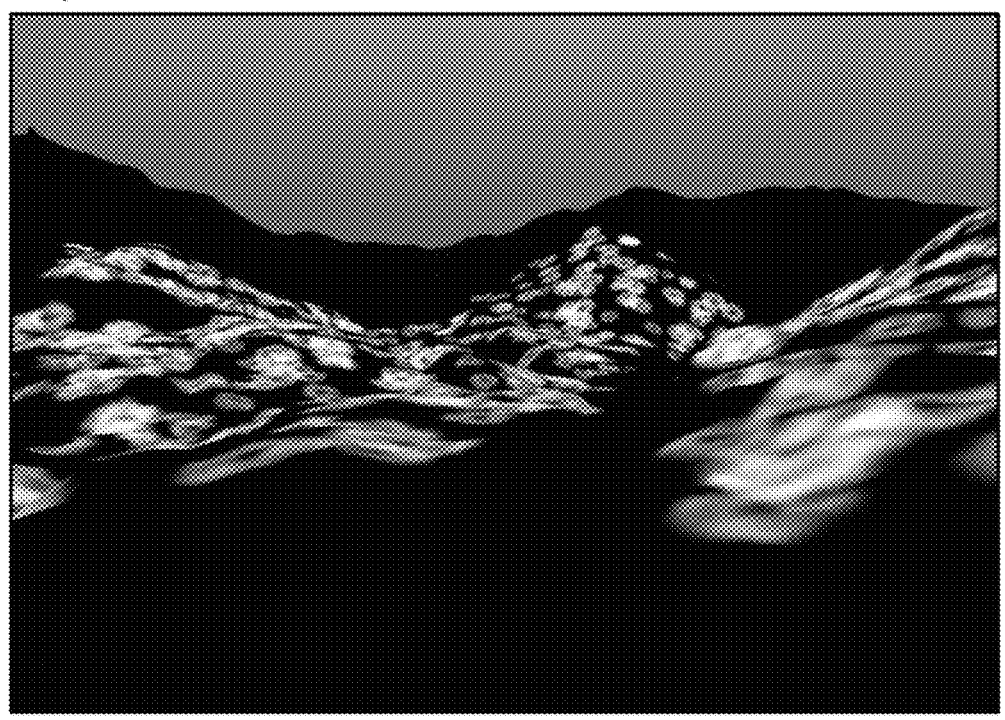
Figure 6F:
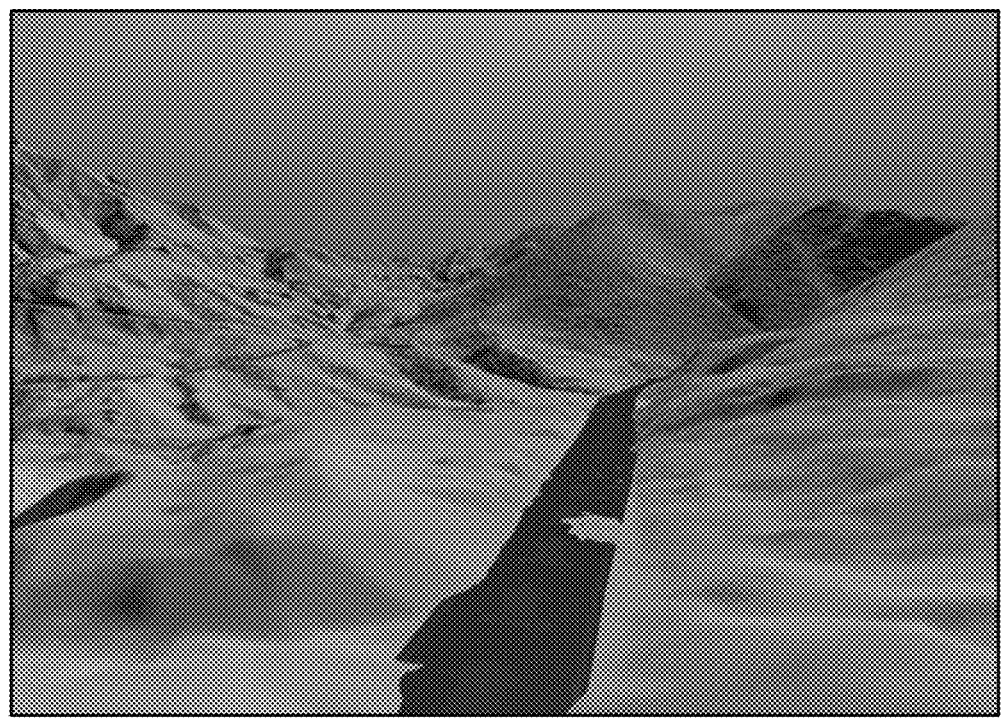
FIG. 6F illustrates the road mask applied to the filtered point cloud data.

FIGS. 6D and 6E provide examples of vegetation masks 630 and 640 applied to filtered point cloud data 620. In some embodiments, the filtered point cloud data 620 can include corresponding categories of masks, such as vegetation, roads, and/or the like. The categories of masks can be determined by the heightfield segmenter module 104 of FIG. 1A. FIG. 6D illustrates the vegetation mask 630 for small bushes. FIG. 6E illustrates the vegetation mask 640 for tall trees. FIG. 6F illustrates the road mask 650 applied to the filtered point cloud data 620.

Figure 6G:
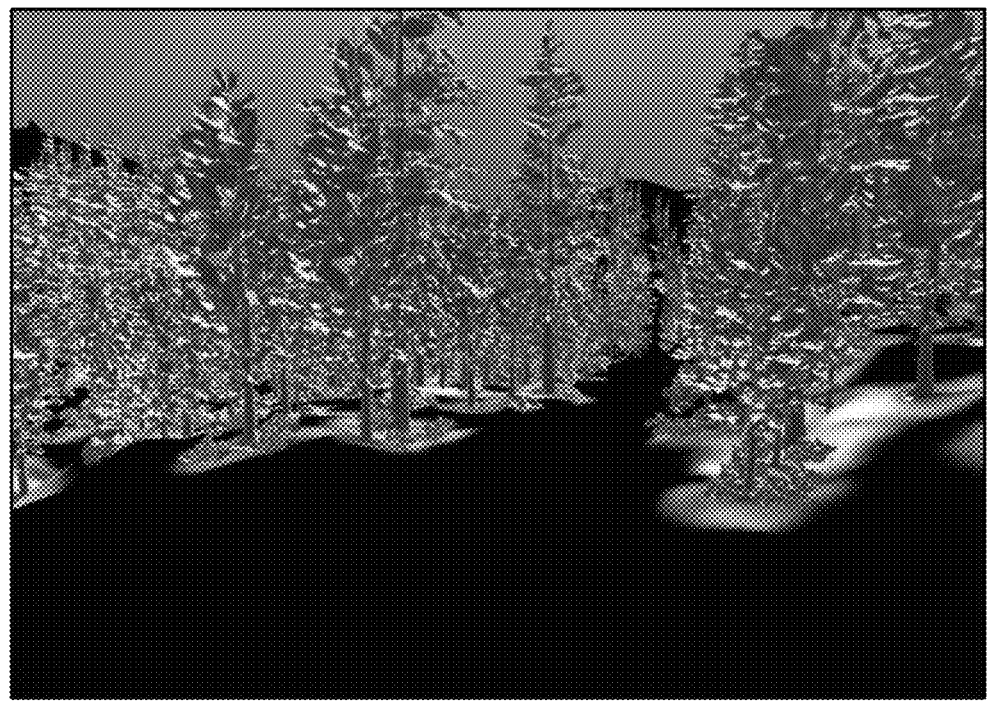
FIG. 6G illustrates a reconstruction of the three dimensional virtual space with tall tree objects placed in the vegetation mask for tall trees.
Figure 6H:
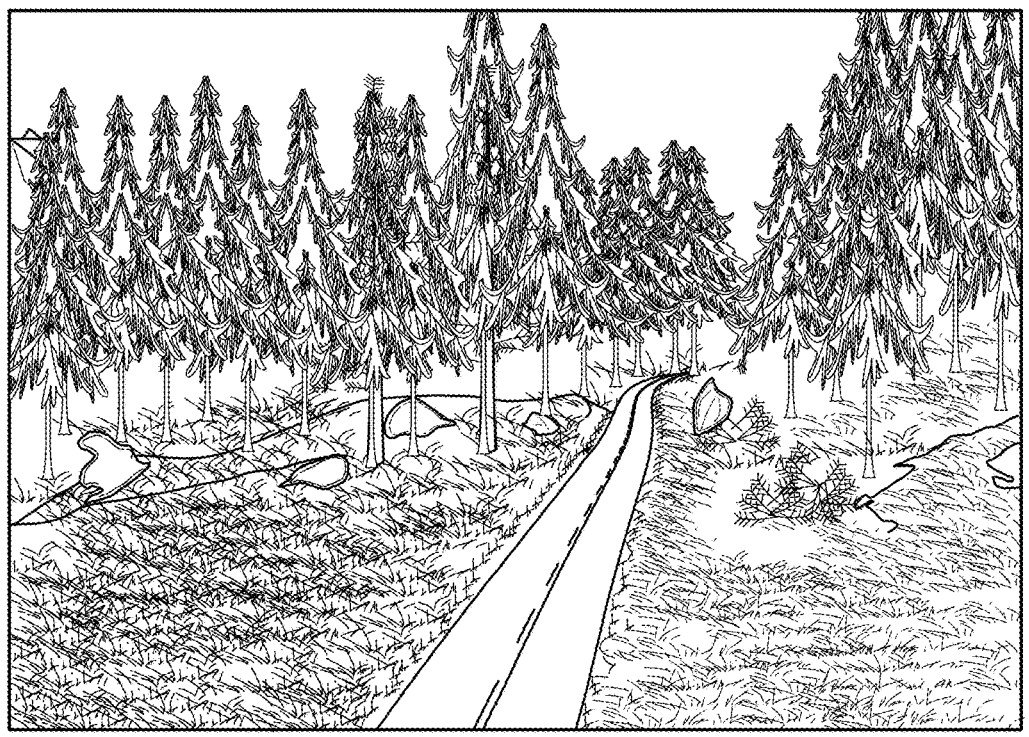
FIG. 6H illustrates a reconstruction of the three dimensional virtual space with tall tree objects, small bushes, and the road placed in the corresponding masks.

FIG. 6G illustrates a reconstruction 660 of the three dimensional virtual space with tall tree objects placed in the vegetation mask 640 for tall trees. FIG. 6H illustrates a reconstruction 670 of the three dimensional virtual space with tall tree objects, small bushes, and the road placed in the corresponding masks 620, 630, and 640. The reconstruction module 114 can reconstruct the three dimensional virtual space by identifying masks and corresponding objects, and placing the objects on the masks.

In some embodiments, the reconstruction module 114 can place objects in order of certain masks. For example, the reconstruction module 114 can place the tall trees first, then the small bushes, and finally the road. In some embodiments, the reconstruction module 114 can account for overlap between objects. For example, the terrain population rules can include extending some bushes beyond the bushes mask. However, a road can be placed where some of the bushes have also been placed. The reconstruction module can identify the intersection between objects and can identify the overlap to indicate an area of concern for a game developer and/or can automatically determine to remove the bushes that overlap with the road, or to place a different type of bush layout over the road.

Overview of Computing Device

Figure 7:
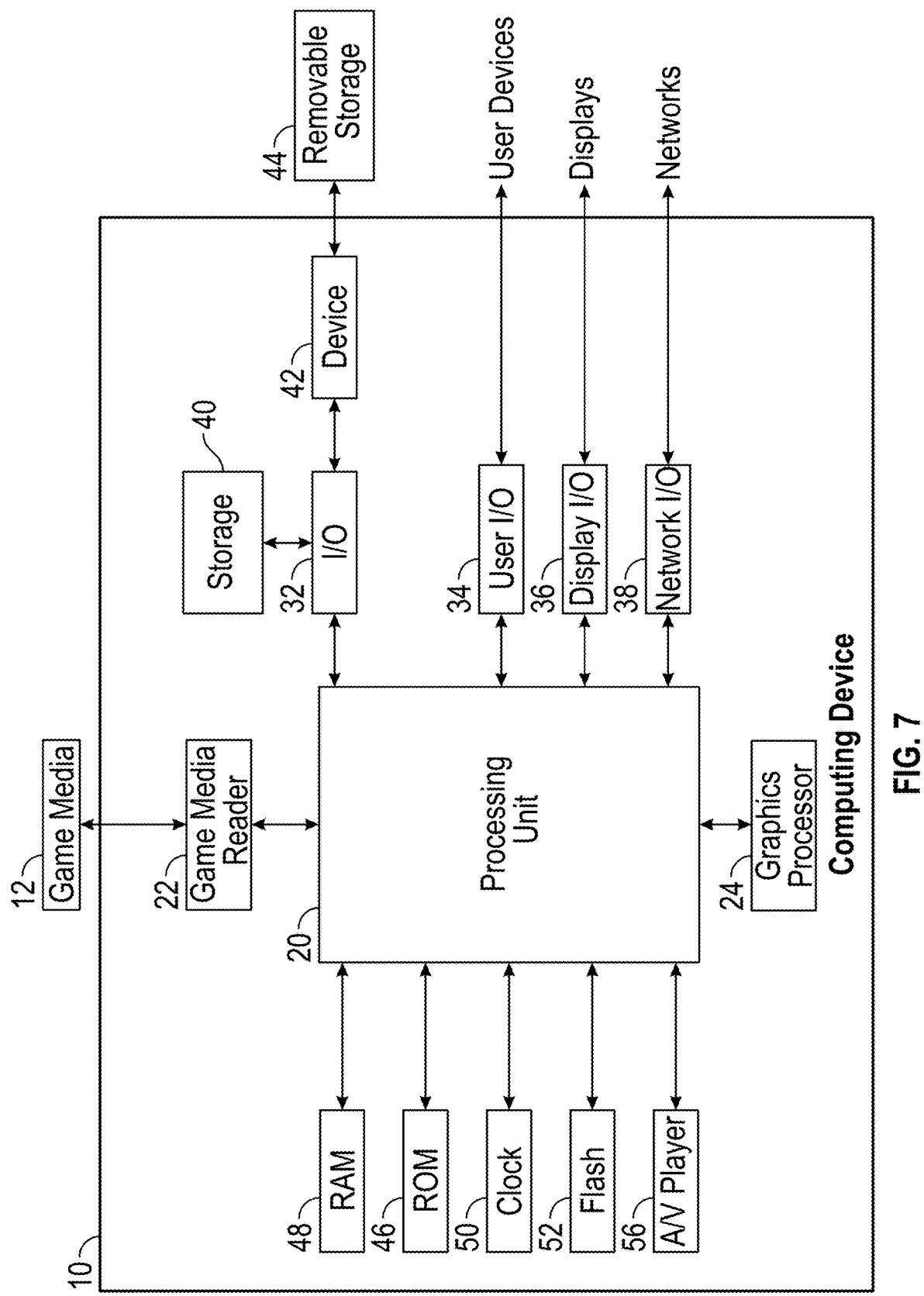
FIG. 7 illustrates an embodiment of computing device.

FIG. 7 illustrates an embodiment of computing device 10. Other variations of the computing device 10 may be substituted for the examples explicitly presented herein, such as removing or adding components to the system described in block diagram 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein, such as the terrain generation and population system described in block diagram 100.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the terrain generation is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of terrain generation, and/or generation of a biome model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may" unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for generating game terrain data of a virtual environment of a video game application, wherein the method is performed by one or more hardware processors configured with computer executable instructions that configure the one or more processors to perform the method comprising:
   receiving first height field data of a first real-world geographical location and a first top view image of the first real-world geographical location, wherein the first height field data comprises elevation data of real-world terrain within the first real-world geographical location;
   segmenting the first top view image into categories of terrain based at least in part on an analysis of the first top view image and the first height field data, resulting in a segmented image;
   applying image masks to each category of terrain within the segmented image;
   receiving three-dimensional (3D) virtual terrain corresponding to first real-world geographical location;
   generating 3D virtual objects that correspond to the categories of terrain within the segmented image;
   placing the 3D virtual objects in the 3D virtual terrain based at least in part on the segmented image; and
   generating instructions to output at least a portion of the 3D virtual terrain for display.

2. The method of claim 1, wherein the first height field data includes real-world height field data of the first real-world geographical location, and the first top view image of the geographical location is a satellite image of the first real-world geographical location.

3. The method of claim 1 further comprising:
   accessing terrain population rules for each category of terrain; and
   applying the terrain population rules on second height field data different than the first height field data.

4. The method of claim 1 further comprising:
   generating a second top view image of the 3D virtual terrain; and determining an amount of variance between the 3D virtual terrain and the first real-world geographical location by comparing the second top view image of the 3D virtual terrain and the first top view image of the first real-world geographical location.

5. The method of claim 4, wherein determining the amount of variance includes a pixel-by-pixel comparison of the first top view image and the second top view image.

6. The method of claim 4, wherein the method further comprises, in response to the amount of variance not satisfying a predetermined threshold:
adjusting weights of terrain population rules based on the amount of variance; and
adjusting the 3D virtual objects based on the terrain population rules with the adjusted weights.

7. The method of claim 1 further comprising applying a frequency filter or an encoder/decoder neural network to the first height field data to generate processed height field data.

8. The method of claim 7 further comprising generating the 3D virtual terrain based on the processed height field data and the elevation data of the first real-world geographical location.

9. A system comprising:
one or more processors configured with computer executable instructions that configure the one or more processors to:
receive first height field data of a first real-world geographical location and a first top view image of the first real-world geographical location, wherein the first height field data comprises elevation data of real-world terrain within the first real-world geographical location;
segment the first top view image into categories of terrain based at least in part on an analysis of the first top view image and the first height field data, resulting in a segmented image;
apply image masks to each category of terrain within the segmented image;
receive three-dimensional (3D) virtual terrain corresponding to first real-world geographical location;
generate 3D virtual objects that correspond to the categories of terrain within the segmented image;
place the 3D virtual objects in the 3D virtual terrain based at least in part on the segmented image; and
generate instructions to output at least a portion of the 3D virtual terrain for display.

10. The system of claim 9, wherein the first height field data includes real-world height field data of the first real-world geographical location, and the first top view image of the geographical location is a satellite image of the first real-world geographical location.

11. The system of claim 9, wherein the one or more processors are further configured to:
access terrain population rules for each category of terrain; and
apply the terrain population rules on second height field data different than the first height field data.

12. The system of claim 9, wherein the one or more processors are further configured to:
generate a second top view image of the 3D virtual terrain; and
determine an amount of variance between the 3D virtual terrain and the first real-world geographical location by comparing the second top view image of the 3D virtual terrain and the first top view image of the first real-world geographical location.

13. The system of claim 12, wherein the one or more processors are further configured to determine the amount of variance using a pixel-by-pixel comparison of the first top view image and the second top view image.

14. The system of claim 12, wherein the one or more processors are further configured to, in response to the amount of variance not satisfying a predetermined threshold:
adjust weights of terrain population rules based on the amount of variance; and
adjust the 3D virtual objects based on the terrain population rules with the adjusted weights.

15. The system of claim 9, wherein the one or more processors are further configured to apply a frequency filter or an encoder/decoder neural network to the first height field data to generate processed height field data.

16. The system of claim 15, wherein the one or more processors are further configured to generate the 3D virtual terrain based on the processed height field data and the elevation data of the first real-world geographical location.

17. A non-transitory computer-readable storage medium having stored thereon instructions that, when executed, cause one or more processors to:
receive first height field data of a first real-world geographical location and a first top view image of the first real-world geographical location, wherein the first height field data comprises elevation data of real-world terrain within the first real-world geographical location;
segment the first top view image into categories of terrain based at least in part on an analysis of the first top view image and the first height field data, resulting in a segmented image;
apply image masks to each category of terrain within the segmented image;
receive three-dimensional (3D) virtual terrain corresponding to first real-world geographical location;
generate 3D virtual objects that correspond to the categories of terrain within the segmented image;
place the 3D virtual objects in the 3D virtual terrain based at least in part on the segmented image; and
generate instructions to output at least a portion of the 3D virtual terrain for display.

18. The non-transitory computer-readable storage medium of claim 17, wherein the one or more processors are further configured to:
access terrain population rules for each category of terrain; and
apply the terrain population rules to generate terrain using a type of artistic style associated with a video game.

19. The non-transitory computer-readable storage medium of claim 17, wherein the one or more processors are further configured to:
generate a second top view image of the 3D virtual terrain; and
determine an amount of variance between the 3D virtual terrain and the first real-world geographical location by comparing the second top view image of the 3D virtual terrain and the first top view image of the first real-world geographical location.

20. The non-transitory computer-readable storage medium of claim 19, wherein the one or more processors are further configured to determine the amount of variance using a pixel-by-pixel comparison of the first top view image and the second top view image.

* * * * *